United States Patent [19]
Orita et al.

[11] Patent Number: 5,843,341
[45] Date of Patent: Dec. 1, 1998

[54] ELECTRO-CONDUCTIVE OXIDE ELECTRODES AND DEVICES USING THE SAME

[75] Inventors: Masahiro Orita, Funabashi; Hiroyuki Sakai, Tokyo; Megumi Takeuchi, Akishima; Hiroaki Tanji, Kawasaki, all of Japan

[73] Assignee: Hoya Corporation, Tokyo, Japan

[21] Appl. No.: 831,972

[22] Filed: Apr. 2, 1997

Related U.S. Application Data

[62] Division of Ser. No. 714,364, Sep. 16, 1996, Pat. No. 5,681,671, which is a division of Ser. No. 470,722, Jun. 6, 1995, Pat. No. 5,622,653.

[30] Foreign Application Priority Data

Jun. 10, 1994 [JP] Japan .................................. 6-128532
Jan. 11, 1995 [JP] Japan .................................... 7-2565
Mar. 24, 1995 [JP] Japan ................................... 7-65840

[51] Int. Cl.$^6$ .............................. H01B 1/08; H01M 4/02; H01L 31/0224; G02F 1/1343

[52] U.S. Cl. ..................... 252/519.1; 429/218; 349/139; 365/111; 136/252; 428/917

[58] Field of Search .............................. 252/518.1, 519.1, 252/519.51, 299.01; 429/209, 218, 231; 349/139; 428/917, 918; 365/111; 136/243, 252

[56] References Cited

U.S. PATENT DOCUMENTS

| 3,811,953 | 5/1974 | Nozik | 136/89 |
| 4,000,346 | 12/1976 | Dowell | 428/336 |
| 5,352,548 | 10/1994 | Fujimoto et al. | 429/197 |

FOREIGN PATENT DOCUMENTS

686982 12/1995 European Pat. Off. .
5238807 9/1993 Japan .
6187832 8/1994 Japan .
9413851 6/1994 WIPO .

OTHER PUBLICATIONS

The 54th Congress of the Society of Applied Physics, preprints, vol. 2, p. 502, "Electrical and optical properties of novel transparent electro–conductive $Dc_{1-x}Y_xSb_2O_6$ thin film" No Date.

The Ceramic Association of Japan, preprints p. 585, (1993) "Electrical and optical properties and electron structure $M^{2+}Ga_2O_4$ ($M^{2+}$=Zn, Cd) spinel" (No Month).

Journal of Solid State Chemistry 74, 98–109 (1988), "Homologous Compounds, $InFeO_3 (ZnO)_m$ (m=1–9)" (No Month).

Mat. Res. Bull., vol. 21, pp. 1057–1062, 1986 "The Nature of the Luminescence of Compounds with $YbFe_2O_4$ Structure" (No Month).

Journal of Solid State Chemistry 60, 382–384 (1985) "Spinel $YbFe_2O_4$, and $YbFe_3O_7$, Types of Structures for Compounds in the $In_2O_3$ and $Sc_2O_3$–$Al_2O_3$–BO Systems . . . " (No Month).

(List continued on next page.)

Primary Examiner—Mark Kopec
Attorney, Agent, or Firm—Burns, Doane, Swecker & Mathis, L.L.P.

[57] ABSTRACT

Electro-conductive oxides showing excellent electro-conductivity, electrodes using the electro-conductive oxide and methods for manufacturing the same are described. The electro-conductive oxides are represented by the general formula: $M(1)_xM(2)_yIn_zO_{(x+3y/2+3s/2)-d}$. The above electro-conductive oxides show not only excellent electro-conductivity but also excellent transparency all over the visible region and therefore they are particularly useful as, for example, electrodes for liquid crystal displays, EL displays and solar cells, which require light transmission.

15 Claims, 4 Drawing Sheets

OTHER PUBLICATIONS

J. Phys. Chem. Solids, 1977, vol. 38, pp. 877–881, "Single Crystal Synthesis and Electrical Properties of $CdSnO_3$, $Cd_2SnO_4$, $In_2TeO_6$ and $CdIn_2O_4$" (No Month).

Journal of Materials Science Letters 9 (1990) 109–111, "Electrical conduction in sintered $Cd_2Sb_2O_7$ pyrochlore" (No Month).

Appl. Phys. Lett. 61 (16) 19 Oct. 1992, pp. 1954–1955 New oxide phase with wide band gap and high electroconductivity, $MgIn_2O_4$ (No Month).

Jpn. J. Appl. Phys. vol. 33 (1994) pp. L238–L240, "New Oxide Phase $Cd_{2(1-x)}Y_{2x}Sb_2O_7$ Pyrochlore with a wide Band Gap and High Electrical Conductivity" (No Month).

Chemical Abstracts, vol. 109, No. 26, p. 151, Dec. 26, 1988, "Layer–structured Hexagonal Crystal Indium Gallium Zinc Magnesium Oxide", Noburo Kimizuka and Naohiko Mori, (National Institute for Research in Inorganic Materials).

Chemical Abstracts, vol. 120, No. 4, p. 412, Jan. 24, 1994, "Transparent Electrically Conductive Oxides", Hiroshi Kawazoe, (Shingijutsu Kaihatsu Jigyodan).

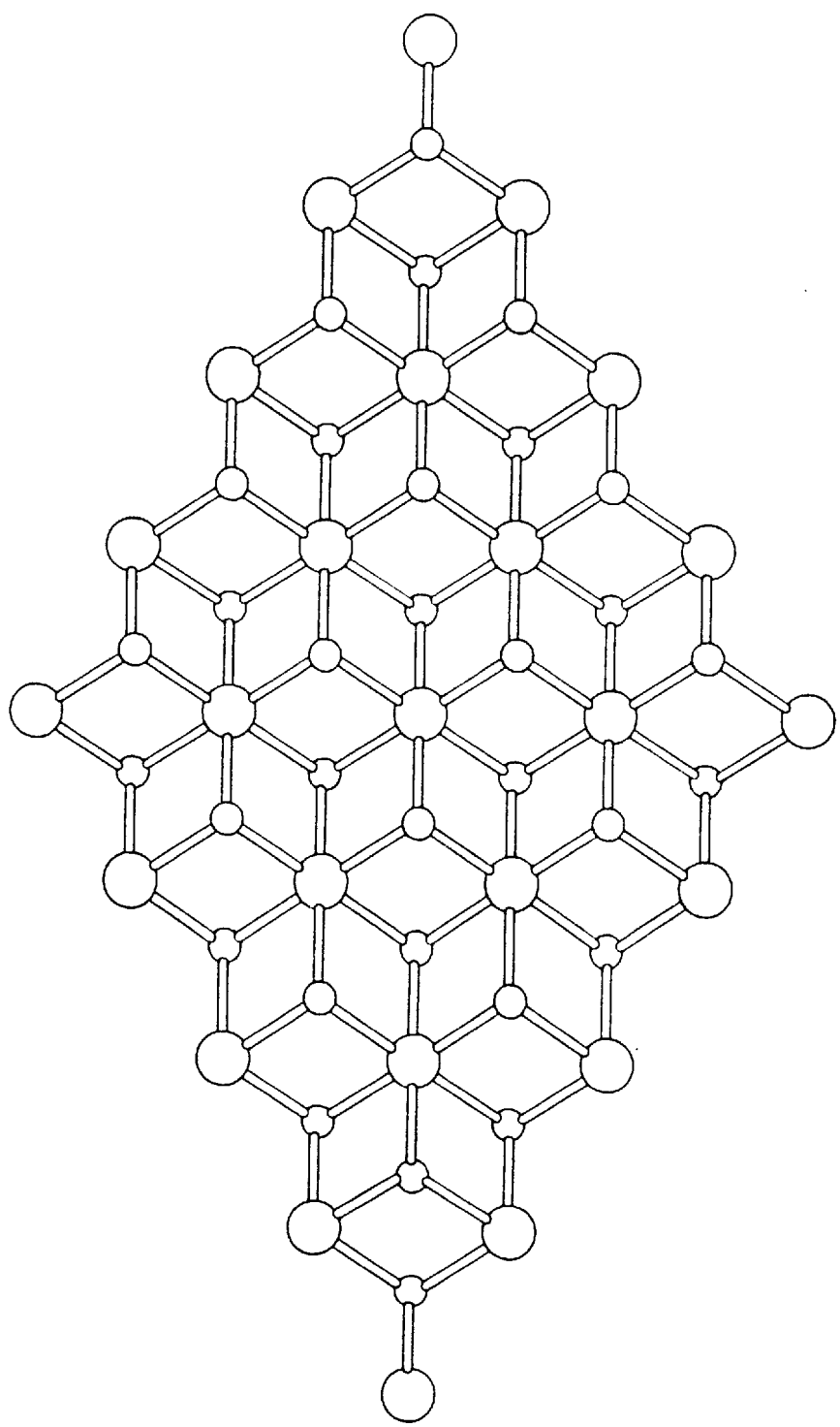
FIG. IA

ELECTRO-CONDUCTIVE OXIDE ELECTRODES AND DEVICES USING THE SAME

This application is a divisional of application Ser. No. 08/714,364, filed Sep. 16, 1996, now U.S. Pat No. 5,681,671 which is a divisional of application Ser. No. 08/470,722, filed on Jun. 6, 1995, now U.S. Pat. No. 5,622,653.

BACKGROUND OF THE INVENTION

1. Field of the Invention

The present invention relates to an electro-conductive oxide showing excellent electro-conductivity, an electrode using the electro-conductive oxide and a method for manufacturing the same. The electro-conductive oxides of the present invention show not only excellent electro-conductivity but also excellent transparency all over the visible region and therefore they are particularly useful as, for example, electrodes for displays and solar cells, which require light transmission.

2. Related art

Transparent electro-conductive materials, which are transparent in the visible region and electro-conductive, are widely used as transparent electrodes of various panel form displays such as liquid crystal displays and EL displays and transparent electrodes of solar cells. They are also used as defogging heaters of chilled show cases, heat ray reflecting films for window glasses of buildings and automobiles, anti-static coatings or electromagnetic wave shields of transparent articles and the like.

As transparent electro-conductive materials, generally used are metal oxide semi-conductors. Various metal oxide materials are proposed and examples thereof include tin oxide ($SnO_2$), indium oxide doped with tin (ITO), $Cd_2SnO_4$ and $CdIn_2O_4$.

Transparency of such transparent electro-conductive materials relates to the fundamental absorption edge wavelength. The term "fundamental absorption edge wavelength" means a wavelength at which light absorbance of the material due to electron transition from a valence band to a conduction band begins to appear. The fundamental absorption edge wavelength may be determined by the reflection method or the transmission method using a spectrophotometer. ITO has its absorption edge around 450 nm and does not absorb light of a wavelength longer than that wavelength. Therefore, it is transparent substantially all over the visible region except for the short wavelength region. On the other hand, it has a carrier concentration comparable to that of metals and a carrier mobility relatively large as an oxide and so it has a high electro-conductivity more than 1000 S/cm. Therefore, among the above-mentioned materials, ITO is particularly widely used.

Various panel form displays are widely used for various electric appliances including telephones, laundry machines, rice cookers, game machines, portable televisions, computers and word-processors. In particular, in note-book type personal computers, word-processors and the like, large panel form displays having a diagonal length of about 10 inches have become prevalent. In addition, researches of further larger panel form displays are continued for use in wall-televisions and the like.

Hitherto, ITO has been used also for transparent electrodes of panel form displays. However, as described hereinbefore, ITO has its fundamental absorption edge wavelength of 450 nm and hence shows poor transparency in the short wavelength region of the visible region (less than 450 nm). Therefore, since a larger thickness of ITO electrodes cause their coloration, a thinner thickness has been preferred. On the other hand, a larger thickness is preferred from the view point of reduction of electric resistance, i.e., reduction of power consumption. Therefore, a suitable thickness of transparent electrodes has been selected considering their transparency and electric resistance.

However, transparent electrodes for panel form displays of a larger size have a longer distance between the ends of the electrode surface and hence electric resistance between the ends is increased. In addition, displays of higher resolution must have a smaller line width of transparent electrodes and this also leads to higher resistance. On the other hand, if the electrode thickness is made larger to decrease electric resistance, it may cause practically unacceptable coloration. That is, conventional ITO practically used so far as materials for transparent electrodes as it is cannot provide large transparent electrodes having both satisfactory transparency and electro-conductivity.

For these reasons, it has been desired to develop materials showing transparency in a short wavelength region of the visible region, i.e., shorter than 450 nm, and high electro-conductivity.

For example, a spinel compound, $ZnGa_2O_4$, was reported as a material having its absorption edge in the short wavelength region below 450 nm, and $ZnGa_2O_4$ shows its absorption edge at 250 nm. However, it shows low electro-conductivity as low as 30 S/cm (The Ceramic Association of Japan, Preprints p585, (1993)).

A trirutile type compound, $CdSb_2O_6$, has also been known. $CdSb_2O_6$ shows its absorption edge at 350 nm. However, it also shows low electro-conductivity as low as 40 S/cm (The 54th Congress of the Society of Applied Physics, Preprints, vol. 2, p502).

That is, there has been known no materials having an absorption edge at a wavelength shorter than 450 nm and showing electro-conductivity comparable to or higher than that of ITO.

Therefore, the object of the present invention is to provide novel materials which do not cause coloration even with a thickness larger than that of conventional ITO films because they have an absorption edge at a wavelength shorter than 450 nm and show electro-conductivity comparable to or higher than that of ITO.

Another object of the present invention is to provide electrodes comprising the above-mentioned novel materials, which are useful for liquid crystal displays, EL displays, solar cells and the like.

SUMMARY OF THE INVENTION

According to the first aspect of the present invention, there is provided an electro-conductive oxide represented by the general formula: $M(1)_xM(2)_yIn_zO_{(x+3y/2-3x/2)-d}$ wherein M(1) is at least one element selected from the group consisting of magnesium and zinc, M(2) is at least one element selected from the group consisting of aluminium and gallium, the ratio (x:y) is within a range of 0.2 to 1.8:1, the ratio (z:y) is within a range of 0.4 to 1.4:1 and the oxygen deficit amount (d) is within a range of $3 \times 10^{31\ 5}$ to $1 \times 10^{-1}$ times the value of $(x+3y/2+3z/2)$ (first embodiment of the present invention).

According to the second aspect of the present invention, there is provided an electro-conductive oxide represented by the general formula: $M(1)_xM(2)_yIn_zO_{(x+3y/2+3z/2)-d}$ wherein M(1) is at least one element selected from the group consisting of magnesium and zinc, M(2) is at least one element selected from the group consisting of aluminium and gallium, the ratio (x:y) is within a range of 0.2 to 1.8:1, the ratio (z:y) is within a range of 0.4 to 1.4:1 and the oxygen deficit amount (d) is within a range of from 0 to $1\times10^{-1}$ times the value of (x+3y/2+3z/2), in which a part of at least one of M(1), M(2) and In is replaced with one or more other elements and the elements replacing M(1) are of di- or higher valence and the elements replacing M(2) and In are of tri- or higher valence (the second embodiment of the present invention).

In addition, according to the third aspect of the present invention, there is provided an electro-conductive oxide represented by the general formula: $M(1)_xM(2)_yIn_zO_{(x+3y/2+3z/2)-d}$ wherein M(1) is at least one element selected from the group consisting of magnesium and zinc, M(2) is at least one element selected from the group consisting of aluminium and gallium, the ratio (x:y) is within a range of 0.2 to 1.8:1, the ratio (z:y) is within a range of 0.4 to 1.4:1 and the oxygen deficit amount (d) is within a range of from 0 to $1\times10^{-1}$ times the value of (x+3y/2+3z/2), which is implanted with cations (the third embodiment of the present invention).

The present invention also provides electrodes consisting of an transparent substrate and an electro-conductive layer provided on at least a part of at least one surface of the substrate, wherein the electro-conductive layer comprises an electro-conductive oxide according to any one of the above-mentioned first to third embodiments of the invention.

In the electrodes of the present invention, it is particularly preferred that the electro-conductive layer comprises an electro-conductive oxide and faces (00n), where n is a positive integer, of the above electro-conductive oxide are oriented in substantially parallel with the surface of the transparent substrate.

BRIEF DESCRIPTION OF THE DRAWINGS

FIG. 1 shows an atomic model of the octahedral structure of $InO_6$ where white circles represent In atoms and black circles represent oxygen atoms, wherein FIG. 1A is a view from a direction perpendicular to the faces (00n) and FIG. 1B is a view from a direction parallel with the faces (00n).

PREFERRED EMBODIMENTS OF THE INVENTION

Figure 1B:
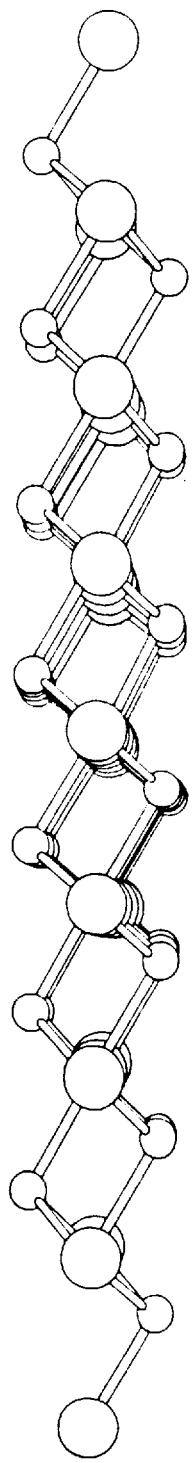

The present invention will be further explained hereinafter.

Electro-conductive oxides according to the first embodiment of the invention

In the general formula: $M(1)_xM(2)_yIn_zO_{(x+3y/2+3z/2)-d}$, M(1) is at least one element selected from magnesium and zinc. Therefore, M(1) may be either magnesium or zinc alone, or magnesium and zinc may coexist as M(1). When magnesium and zinc coexist, the ratio of magnesium and zinc is not particularly limited. However, when magnesium is increased, the absorption edge is sifted to a shorter wavelength and hence transparency is enhanced. When zinc is increased, electro-conductivity is enhanced.

M(2) may be either aluminium or gallium alone, or aluminium and gallium may coexist as M(2). When aluminium and gallium coexist, the ratio of aluminium and gallium is not particularly limited. However, when aluminium is increased, the crystallization temperature becomes higher. When gallium is increased, the crystallization temperature becomes lower.

The ratio (x:y) should be in the range of 0.2 to 1.8:1 and, when x/y is below 0.2, deposition of $InGaO_3$ phase is significant and thus electro-conductivity is lowered. When x/y exceeds 1.8, crystalline structure becomes unstable. The ratio (x:y) is preferably in the range of 0.3 to 1.6:1, more preferably, in the range of 0.4 to 1.3:1.

The ratio (z:y) should be in the range of 0.4 to 1.4:1 and, when z/y is below 0.4, deposition of $ZnGa_2O_4$ phase and the like is significant and thus electro-conductivity is lowered. When z/y exceeds 1.4, $In_2O_3$ phase is deposited and transparency is deteriorated. The ratio (z:y) is preferably in the range of 0.6 to 1.4:1, more preferably, in the range of 0.8 to 1.2:1.

The oxygen deficit amount (d) should be in the range of $3\times10^{-5}$ to $1\times10^{-1}$ times the value of (x+3y/2+3z/2). In general, if the oxygen deficit amount (d) is too small, electro-conductivity is unduly lowered and, when it is too large, transparency is unduly deteriorated due to absorption of visible lights.

When the oxygen deficit amount (d) is below $3\times10^{-5}$ times the value of (x+3y/2+3z/2), electro-conductivity becomes too low and is not practically acceptable. On the other hand, when the oxygen deficit amount (d) exceeds $3\times10^{-1}$ times the value of (x+3y/2+3z/2), the material begins to absorb visible rays and it is not preferred. The oxygen deficit amount (d) is preferably in the range of $1\times10^{-3}$ to $1\times10^{-1}$ times the value of (x+3y/2+3z/2), more preferably, in the range of $1\times10^{-2}$ to $1\times10^{-1}$ times the value of (x+3y/2+3z/2).

The term "oxygen deficit amount" means a value obtained by subtracting number of oxygen ions contained in 1 mol of oxide crystalline from the stoichiometric amount of the ions, which is expresses in the mol unit. The number of oxygen ions contained in oxide crystals can be determined by measuring the amount of carbon dioxide produced by heating the oxide crystals in carbon powder through infrared absorption spectrum analysis. The stoichiometric number of oxygen ions can be calculated from the mass of oxide crystals.

When the amount of carrier electrons in conduction bands is in a certain range, the oxides of the present invention show good electro-conductivity. Such an amount of carrier electrons is in the range of from $1\times10^{18}/cm^3$ to $1\times10^{22}/cm^3$, preferably from $1\times10^{19}/cm^3$ to $5\times10^{21}/cm^3$.

The amount of carrier electrons may be determined by the van der Pauw method electro-conductivity measurement apparatus.

As specific examples of oxides of the first embodiment, there can be mentioned electro-conductive oxides represented by the general formula: $In_2Ga_2ZnO_{7-d}$ and have an oxygen deficit amount (d) of from $2.1\times10^{-4}$ to 0.7. When the oxygen deficit amount (d) is below $2.1\times10^{-4}$, electro-conductivity becomes too low and practically useful electro-conductivity cannot be obtained. On the other hand, oxygen deficit amount (d) exceeding 0.7 is not preferred since visible rays begin to be absorbed. The oxygen deficit amount (d) is preferably in the range of from $7\times10^{-3}$ to 0.7, more preferably, from $7\times10^{-2}$ to 0.7.

With respect to the oxides represented by the general formula: $In_2Ga_2ZnO_{7-d}$, there have been the following three reports all of which are directed to the oxides where d is 0.

In the first two reports, Kimizuka et al. analyzed crystalline structures of the oxides represented by the general formula: $In_2Ga_2ZnO_7$ (K. Kato, I. Kawada, N. Kimizuka and T. Katsura, Z. Kristallogr. vol. 143, p278, (1976) and N. Kimizuka, T. Mohri, Y. Matsui and K. Shiratori, J. Solid State Chem., vol.74, p98 (1988)).

Kimizuka et al. synthesized the oxides represented by the general formula: $In_2Ga_2ZnO_7$ from $In_2O_2$, $Ga_2O_3$ and ZnO, and obtained their powder X-ray diffraction data to reveal that they have a $Yb_2Fe_3O_7$ form structure. According to Kimizuka et al., $Yb_2Fe_3O_7$ comprises $YbO_{1.5}$ layers (U layers), $Fe_2O_{2.5}$ layers (T layers) and $Fe_2O_{1.5}$ layers (V layers). The U layer is formed from three layers of a Yb layer and oxygen layers on and under the Yb layer. The T layer and the V layer are formed from Fe and oxygen locating in substantially the same plane. $Yb_2Fe_3O_7$ is a crystal formed from three types of layers, U, T and V, stacked in the order of U, T, T, U, V, U, T, T, U, V, U. Upon the T layers and the U layers are stacked, coulomb energy is minimized because cation layers are placed on anions arrayed in triangles and thereby a dipyramid structure in three-fold symmetry is formed. In the oxides represented by the general formula: $In_2Ga_2ZnO_7$, Yb sites of the U layers are occupied by In, Fe sites of the T layers are occupied by Ga and Zn in a ratio of 1:1, and the Fe sites of the V layers are occupied by Ga.

The third report includes the results of the analysis of the relations between $In_2Ga_2ZnO_7$, $ZnGa_2O_4$ and ZnO phases at 1350° C. (M. Nakamura, N. Kimizuka and T. Mohri, J. Solid State Chem. vol. 93 (2), p298 (1991)).

The above-mentioned reports are, to the present inventors' knowledge, all of the reports which has been made on the oxides represented by the general formula: $In_2Ga_2ZnO_7$ up to now. All of these reports did not consider the oxygen deficit amount and the oxides were not subjected to any treatment to cause the oxygen deficit. In contrast, the specific examples of the first embodiment of the present invention, represented by the general formula: $In_2Ga_2ZnO_{7-d}$, are electro-conductive oxides having an oxygen deficit amount (d) of from $2.1 \times 10^{-4}$ to 0.7.

Other specific examples of the oxides according to the first embodiment are those represented by the general formula: $M(1)M(2)InO_4$ and having an oxygen deficit amount (d) of from $1.2 \times 10^{-4}$ to 0.4. Some of the oxides of the general formula: $M(1)M(2)InO_4$ have been already known. However, all of those known oxides have no oxygen deficit. In contrast, the electro-conductive oxides of the present invention has an oxygen deficit amount (d) of $1.2 \times 10^{-4}$ to 0.4 and therefore they are novel materials.

As the published research reports of the materials represented by the general formula: $M(1)M(2)InO_4$, there can be mentioned, for example, the report of V. A. Kutoglu et al. which describes crystalline structures of $MgAlInO_4$ and $MgGaInO_4$ (Z. Anorg. Allg. Chem., vol. 456, p130–146 (1979)). According to this report, both of $MgAlInO_4$ and $MgGaInO_4$ have a monoclinic structure in which layers of oxygen in six-fold symmetry are stacked in the order of ababcacabcbc, and Mg and Al (or Ga) are located at the centers of deformed dipyramids in three-fold symmetry formed from oxygen. Indium has its coordination number of 6, and forms layers in four-fold symmetry between the oxygen layers. N. Kimizuka et al. later confirmed that $MgGaInO_4$ has this crystalline structure and termed $YbFe_2O_4$ form structure (J. Solid State Chem., vol. 60, p382–384 (1985)).

G. Blasse et al. reported the fluorescent properties of $MgGaInO_4$ (Mat. Res. Bull. vol. 21, p1057–1062). According to this report, $MgGaInO_4$ does not radiate fluorescence at room temperature, but it radiates orange fluorescence when it is irradiated with ultraviolet rays at 250 K or lower. It has wide luminescence and absorption spectra bands to a low temperature as low as 5 K and it has an absorption band of from 240 nm to 400 nm with the center of 310 nm and a luminescence band of from 450 nm to 700 nm or more with the center of 550 nm at 5 K. From these results, G. Blasse et al. assumed that the bands spread two-dimensionally and upper part of the valence electron band and lower part of the conduction band are formed from the In layer and the oxygen layers on its both sides. However, this report does not refer to the location of the absorption band at room temperature at all.

As mentioned above, several reports on the materials represented by the general formula: $M(1)M(2)InO_4$ have been published so far. However, none of them refers to their transparency and electro-conductivity, and thus none of them tried to use $M(1)M(2)InO_4$ as transparent electro-conductive materials.

Under the circumstances described above, the present inventors have been found that $MgGaInO_4$ has an absorption edge wavelength of around 330 nm and shows transparency all over the visible region, the conduction band can be implanted with electrons and therefore it can show electro-conductivity by implanting electrons into the conduction bands. In addition, it is found that the above-described optical properties and electro-conductivity of $MgGaInO_4$ can be obtained even though a part or all of its Mg sites are replaced with Zn and a part or all of its Ga sites are replaced with Al.

The electro-conductive oxide of the present invention represented by the general formula: $M(1)M(2)InO_{4-d}$ can be also represented by the general formula: $Mg_aZn_{1-a}Al_bGa_{1-b}InO_{4-d}$ wherein a is 0 to 1 and b is 0 to 1.

Specific examples of the electro-conductive oxides of the present invention represented by $Mg_aZn_{1-a}Al_bGa_{1-b}InO_{4-d}$ are, for example, $MgAlInO_{4-d}$, $ZnAlInO_{4-d}$, $MgGaInO_{4-d}$, $ZnGaInO_{4-d}$, $Mg_aZn_{1-a}AlInO_{4-d}$, $Mg_aZn_{1-a}GaInO_{4-d}$, $MgAl_bGa_{1-b}InO_{4-d}$ and $ZnAl_bGa_{1-b}InO_{4-d}$. The values of a and b in the formulae can be suitably selected by considering optical properties and electro-conductivity required for the electro-conductive oxides depending on their compositions.

The above-described electro-conductive oxides should have an oxygen deficit amount (d) of from $1.2 \times 10^{-4}$ to 0.4. Because of the oxygen deficit amount in this range, there can be provided materials which can be suitably used as electrodes and the like. The oxygen deficit amount (d) is, from the view point of good balance of electro-conductivity and transparency, preferably in the range of from $4 \times 10^{-3}$ to 0.4, more preferably from $4 \times 10^{-2}$ to 0.4.

Electro-conductive oxides according to the second embodiment of the invention

As to the electro-conductive oxides according to the second embodiment of the invention, the descriptions for the electro-conductive oxides according to the first embodiment of the invention hereinbefore about their M(1), M(2), the ratio (x:y) and the ratio (z:y) in the general formula: $M(1)_xM(2)_yIn_zO_{(x+3y/2+3z/2)-d}$ can be applied.

Further, in the electro-conductive oxides according to the second embodiment of the invention, a part of at least one of M(1), M(2) and In is replaced with one or more other elements and the elements replacing M(1) are of di- or higher valence and the elements replacing M(2) and In are of tri- or higher valence. By replacing a part of at least one of M(1), M(2) and In with one or more other elements, it is possible to implant electrons into the oxides.

In the electro-conductive oxides according to the second embodiment of the invention, in addition to the introduction of oxygen deficit, the replacement of a part of the metal ions with other metal ions to implant carrier electrons into the conduction band can provide electro-conductivity.

Mg and Zn used for M(1) are divalent elements and so elements capable of replacing them are divalent elements or elements of higher valence. As the valence of elements becomes higher, larger amount of carrier can be implanted with the same amount. Valence of elements which can be used for the replacement is normally di-, tri-, tetra-, penta- or hexavalence.

Examples of the elements of divalence or higher valence are, for example, Be, Mg, Ca, Sr, Ba, Cd, Al, Si, Sc, Ti, V, Cr, Mn, Fe, Co, Ni, Zn, Ga, Ge, Y, Zr, Nb, Mo, Tc, Ru, Rh, Pd, In, Sn, Sb, La, Ce, Pr, Nd, Pm, Sm, Eu, Gd, Tb, Dy, Ho, Er, Tm, Yb, Lu, Hf, Ta, W, Re, Os, Ir, Pt, Tl, Pb, Bi and Po.

Al and Ga used for M(2) and In are trivalent elements and so elements capable of replacing them are trivalent elements or elements of higher valence. As the valence of elements becomes higher, larger amount of carrier can be implanted with the same amount. Valence of elements which can be used for the replacement is normally tri-, tetra-, penta- or hexavalence.

Examples of the elements of trivalence or higher valence are, for example, Al, Si, Sc, Ti, V, Cr, Mn, Fe, Co, Ni, Ga, Ge, Y, Zr, Nb, Mo, Tc, Ru, Rh, Pd, In, Sn, Sb, La, Ce, Pr, Nd, Pm, Sm, Eu, Gd, Tb, Dy, Ho, Er, Tm, Yb, Lu, Hf, Ta, W, Re, Os, Ir, Pt, Tl, Pb, Bi and Po.

As described above, by replacing a part of M(1), M(2) and/or In with elements such as those mentioned above, carrier electrons are implanted into conduction bands. The suitable amount of implanted carrier electrons is, from the view point of good balance of electro-conductivity and transparency, for example, in the range of from $1 \times 10^{18}/cm^3$ to $1 \times 10^{22}/cm^3$ and replacing amount of each element can be suitably selected so that the compound has the amount of implanted electrons in the range mentioned above. When the implanted amount of electrons is less than $1 \times 10^{18}/cm^3$, sufficient electro-conductivity cannot be obtained. When it exceeds $1 \times 10^{22}/cm^3$, absorption due to plasma oscillation appears in the visible region and thus transparency is deteriorated. The amount of implanted carrier electrons is preferably in the range of from $1 \times 10^{19}/cm^3$ to $5 \times 10^{21}/cm^3$.

Some of the elements used for the replacement may have properties of absorbing visible rays. Therefore, the amount of the replacing amount of the elements is suitably selected so that more than 70%, preferably more than 80%, more preferably more than 90% of average visible light transmission can be obtained.

Specific examples of the oxides according to the second embodiment include electro-conductive oxide of the general formula: $In_2Ga_2ZnO_{7-d}$ wherein the oxygen deficit amount (d) is in the range of 0 to 0.7, a part of at least one of In, Ga and Zn is replaced with other elements, the elements replacing In and Ga are of trivalence or higher valence and the elements replacing Zn are of divalence or higher valence.

Indium and gallium are trivalent elements and so elements capable of replacing them are trivalent elements or elements of higher valence. As the valence of elements becomes higher, larger amount of carrier electrons can be implanted with the same amount. While valence of elements which can be used for the replacement is normally tri- to hexavalence, it is preferred to use elements of tetravalence or of higher valence as the replacing elements. Examples of the elements which can be used for the replacement are those mentioned hereinbefore.

Zn is a divalent element and so elements capable of replacing it are divalent elements or elements of higher valence. As the valence of elements becomes higher, larger amount of carrier electrons can be implanted with the same amount. While valence of elements which can be used for the replacement is normally di- to hexavalence, it is preferred to use elements of trivalence or of higher valence as the replacing elements. Examples of the elements which can be used for the replacement are those mentioned hereinbefore.

The oxygen deficit amount (d) and the replaced amounts of In, Ga and Zn elements are preferably selected so that the compounds has an amount of carrier electrons in the range of from $1 \times 10^{18}/cm^3$ to $1 \times 10^{22}/cm^3$. Preferred amount of carrier electrons is in the range of $1 \times 10^{19}/cm^3$ to $5 \times 10^{21}/cm^3$.

Even though the oxygen deficit amount (d) is 0, oxides with a desired electro-conductivity can be obtained by suitably selecting the replaced amounts of the elements In, Ga and Zn. However, the oxygen deficit amount (d) exceeding 0.7 may cause absorption of visible light and hence is not preferred.

The oxygen deficit amount (d) is preferably in the range of $2.1 \times 10^{-4}$ to 0.7 from the viewpoint of endowing a preferred amount of carrier electrons together with the replacing elements.

Specific examples of the oxides of the second embodiments include those represented by the general formula: $M(1)M(2)InO_{4-d}$, which corresponds to the general formula: $M(1)_xM(2)_yIn_zO_{(x+3y/2+3z/2)-d}$ where x, y and z are 1, where a part of M(1), M(2) and/or In is replaced with one or more other elements. Examples of elements which can be used for the replacement are those described hereinbefore.

The electro-conductive oxides represented by the general formula: $M(1)M(2)InO_{4-d}$ may also be represented by the general formula: $Mg_aZn_{1-a}Al_bGa_{1-b}InO_4$ wherein a is 0 to 1 and b is 0 to 1. That is, the oxides of the second embodiments include those represented by the general formula: $Mg_aZn_{1-a}Al_bGa_{1-b}InO_4$ where a part of Mg, Zn, Al, Ga and In is replaced with one or more other elements.

Examples of the above-mentioned oxides represented by $Mg_aZn_{1-a}Al_bGa_{1-b}InO_4$ include, for example, $MgAlInO_4$, $ZnAlInO_4$, $MgGaInO_4$, $ZnGaInO_4$, $Mg_aZn_{1-a}AlInO_4$, $Mg_aZn_{1-a}GaInO_4$, $MgAl_bGa_{1-b}InO_4$ and $ZnAl_bGa_{1-b}InO_4$. The values of a and b in the formulae may be suitably selected considering optical properties and electro-conductivity required for the electro-conductive oxides depending on their compositions.

Due to the replacement of a part of at least one of M(1), M(2) and In with other elements, carrier electrons are implanted into the conduction bands. As described above, carrier electrons can be implanted into conduction bands also by introducing oxygen deficit. Therefore, in the oxides of the second embodiment, carrier electrons are implanted into conduction bands by replacement of elements, or by replacement of elements and oxygen deficit.

The amount of carrier electrons is preferably in the range of from $1 \times 10^{18}/cm^3$ to $1 \times 10^{22}/cm^3$ as described above. The amount of each element to be replaced, or the amounts of elements to be replaced and the oxygen deficit amount are suitably selected so that the oxides have the amount of carrier electrons in the range defined above. The amount of carrier electrons is preferably in the range of $1 \times 10^{19}/cm^3$ to $5 \times 10^{21}/cm^3$.

Electro-conductive oxides according to the third embodiment of the invention

As to the electro-conductive oxides according to the third embodiment of the invention, the descriptions hereinbefore for the electro-conductive oxides according to the first embodiment of the invention about their M(1), M(2), the ratio (x:y) and the ratio (z:y) in the general formula: $M(1)_xM(2)_yIn_2O_{(x+3y/2+3z/2)-d}$ can be applied. Further, in the electro-conductive oxides according to the third embodiment of the invention, the oxides of the general formula mentioned above are implanted with cations.

In the electro-conductive oxides according to the third embodiment of the invention, other than the introduction of oxygen deficit, implantation of cation provides implantation of carrier electrons into conduction bands and thereby electro-conductivity can be provided.

The cations implanted into the electro-conductive oxides according to the third embodiment of the invention are not particularly limited so long as they can form solid solution with the oxides without destroying crystalline structures of the oxides. However, ions with a smaller ionic radius can more easily form solid solution by entering into crystal lattice, whereas ions with a larger ionic radius are more likely to destroy crystalline structures.

Example of such cations are, for example, H, Li, Be, B, C, Na, Mg, Al, Si, K, Ca, Sc, Ti, V, Cr, Mn, Fe, Co, Ni, Cu, Zn, Ga, Ge, Y, Zr, Nb, Mo, Tc, Ru, Rh, Pd, Ag, Cd, In, Sn, Sb, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb and Bi.

Specific examples of the oxides of the third embodiment include electro-conductive oxides represented by the general formula: $In_2Ga_2ZnO_{7-d}$ wherein the oxygen deficit amount (d) is in the range of from 0 to 0.7, which is implanted with cations.

Further specific examples of the oxide of the third embodiment are oxides of the general formula: $M(1)M(2)InO_{4-d}$, which corresponds to the general formula: $M(1)_xM(2)_yIn_2O_{(x+3y/2+3z/2)-d}$ where x, y and z are 1, which are implanted with cations.

The electro-conductive oxides of the general formula: $M(1)M(2)InO_{4-d}$ may also be represented by the general formula $Mg_aZn_{1-a}Al_bGa_{1-b}InO_4$ where a is in a range of 0 to 1 and b is in a range of 0 to 1. That is, the oxide of the third embodiment may be an oxide of the general formula: $Mg_aZn_{1-a}Al_bGa_{1-b}InO_4$ which is implanted with cations.

Examples of the above-mentioned oxides represented by $Mg_aZn_{1-a}Al_bGa_{1-b}InO_4$ include, as mentioned above, $MgAlInO_4$, $ZnAlInO_4$, $MgGaInO_4$, $ZnGaInO_4$, $Mg_aZn_{1-a}AlInO_4$, $Mg_aZn_{1-a}GaInO_4$, $MgAl_bGa_{1-b}InO_4$ and $ZnAl_bGa_{1-b}InO_4$. The values of a and b in the formulae may be suitably selected considering optical properties and electro-conductivity required for the electro-conductive oxides depending on their compositions.

Electrodes of the invention

The electrode of the present invention is one consisting of an transparent substrate and an electroconductive layer provided on at least a part of at least one surface of the substrate, wherein the electro-conductive layer comprises an electro-conductive oxide of any one of the first, second and third embodiments of the present invention.

The electro-conductive layer of the electrode according to the present invention may be composed solely of the electro-conductive oxide of the first, second or third embodiment of the present invention, or it may be an oxide layer wherein those oxides coexist with other crystals. However, the amount of the coexisting other crystals should be selected so that they do not cause any problems relating to transparency and electro-conductivity of the oxide layer in practical use. Examples of the crystals which may coexist with the electro-conductive oxides of the present invention are, but not limited to, ITO, $In_2O_3$ and $SnO_2$.

Preferably, the electrode of the present invention has a electro-conductive layer on at least a part of at least one surface of the transparent substrate and the electro-conductive layer is composed solely of the electro-conductive oxide and the faces (00n), where n is a positive integer, of the oxide are oriented in substantially parallel with the surface of the transparent substrate, because such a structure may produce higher electro-conductivity.

This point will be further explained by referring to the appended drawings.

The oxides of the present invention represented by the general formula: $M(1)_xM(2)_yIn_2O_{(x+3y/2+3z/2)}$ basically have an octahedral structure composed of $InO_6$. FIG. 1 shows an atomic model of the octahedral structure of $InO_6$ where white circles represent In atoms and black circles represent oxygen atoms. FIG. 1A is a view from a direction perpendicular to the faces (00n) and FIG. 1B is a view from a direction parallel with the faces (00n).

Figure 2:
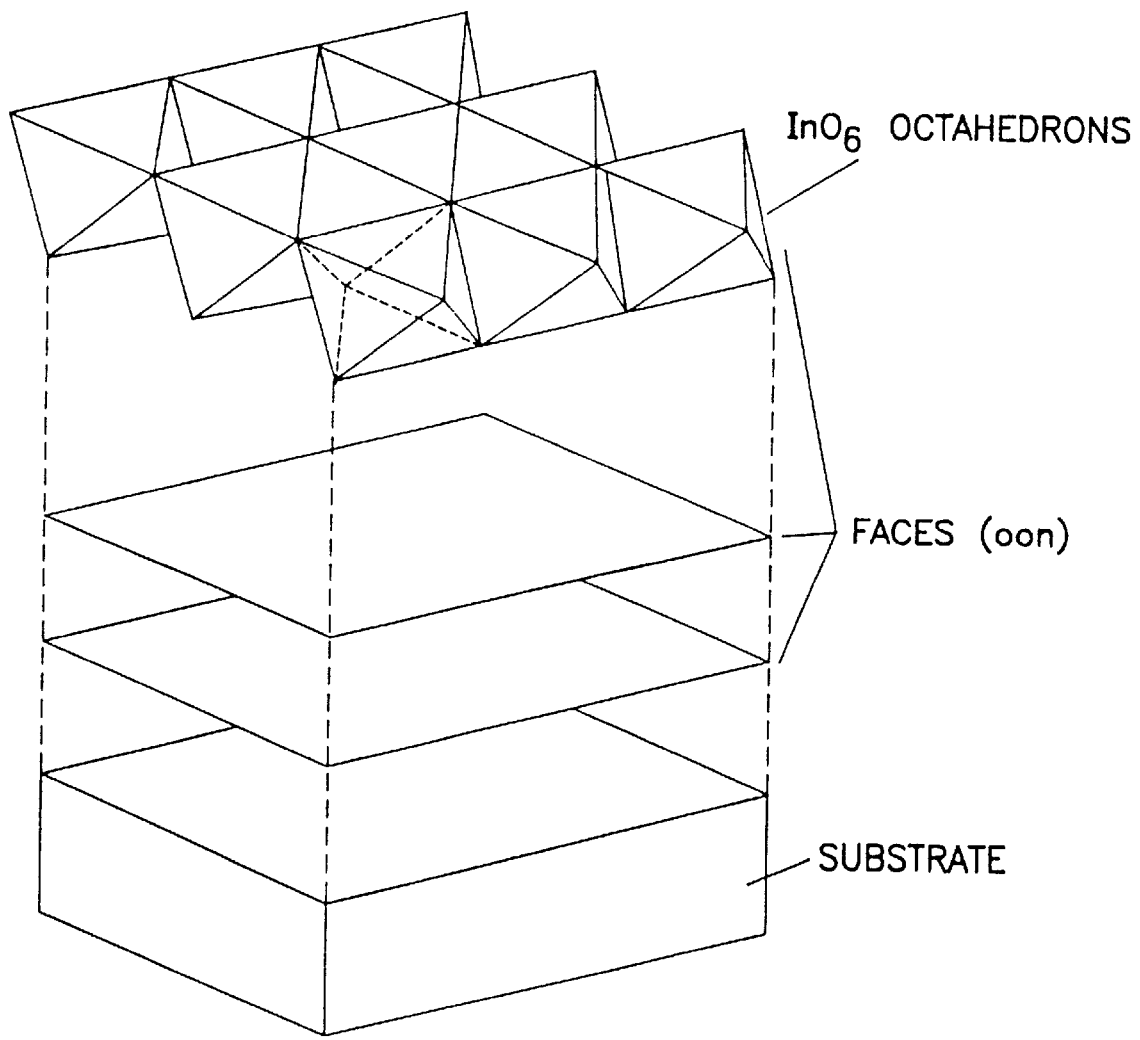
FIG. 2 shows a schematic view of the relation of octahedrons of $InO_6$, faces (00n) of the octahedrons and the substrate.

FIG. 2 is a schematic view of the relation of octahedrons of $InO_6$, faces (00n) of the octahedrons and the substrate.

Figure 3:
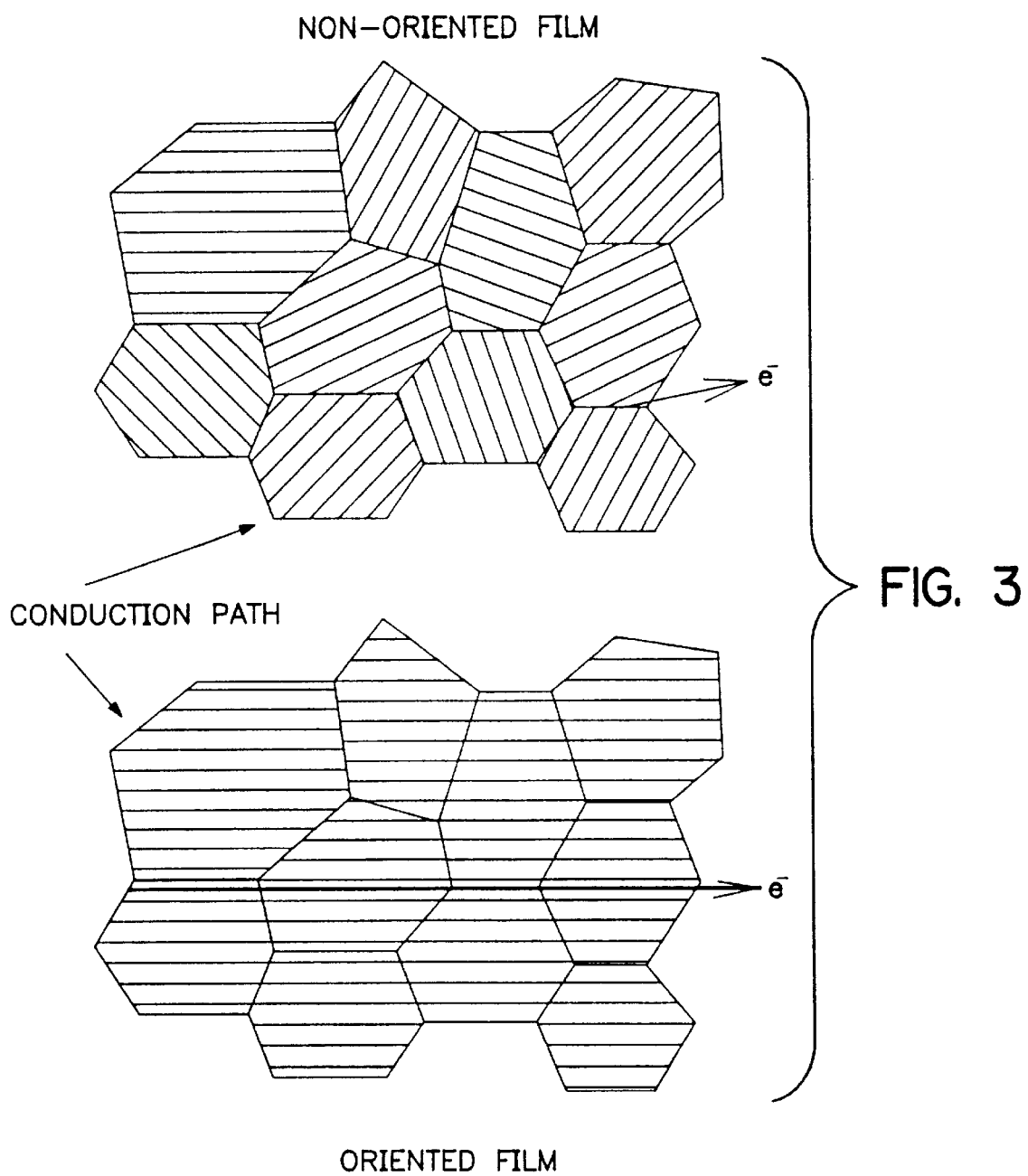
FIG. 3 shows routes for electrons being linear in oriented films and being zigzag in non-oriented films.

In the electrode of the present invention, the faces (00n), where n is a positive integer, of the electro-conductive oxide are preferably oriented in substantially parallel with the surface of the transparent substrate, because such a structure may produce higher electro-conductivity. That is, as schematically shown in FIG. 3, routes for electrons may be linear in oriented films and hence higher electro-conductivity can be obtained, whereas the routes would be zigzag in non-oriented films.

The thickness of the electro-conductive layer of the electrode according to the invention may be suitably selected considering optical properties and conductivity required for the electrode, purpose of the electrode and the like. For example, in the case of electrodes for liquid crystal panels, it may be in a range of from about 30 nm to about 1 $\mu$m. Some of the elements contained in the oxide show absorbency in the visible region and, in such a case, a relatively thin film is preferred. When elements contained in the oxide show little or no absorbency in the visible region, a larger thickness can be used and hence higher conductivity can be obtained.

The transparent substrate may be a transparent substrate made of glass, resins and the like.

Glass substrates are often used in liquid crystal displays and the like. Glass substrates may be composed either of soda lime glass or glass with low alkalinity and, in general, soda lime glass is widely used. However, glass with low alkali content is suitable for color displays, high quality displays and the like. It is preferred to use glasses showing high transparency in the visible region and excellent in flatness.

Resin substrates may be, for example, polyester substrates, PMMA substrates or the like. Unlike glass substrates, resin substrates are relatively light, thin and flexible, that is, they have more flexibility in their shape. Therefore, there have been proposed various uses making the most of these properties of resin substrates. For example, they are used for films for electrophotography, liquid crystal displays, optical memories, transparent turbulent switches, antistatic films, heat reflecting films, planar heater films and the like. In the case of liquid crystal displays, it is preferred to select substrates considering their processability, impact resistance, durability, adaptability to assembling process and the like, in addition to high transparency in the visible region and good flatness.

The electrodes of the present invention may also have an underlying layer provided on the transparent substrate. Example of the underlying layer are color filters, TFT layers, EL luminescent layers, metal layers, semi-conductor layers, insulating layers and the like. Two or more kinds of the underlying layers may be used simultaneously.

The electrodes of the present invention may be used for various applications. For example, they may be suitably used as electrodes of liquid crystal displays, EL displays, solar cells and the like.

While liquid crystal displays are classified into various types such as TFT type, STN type and MIM type, all of them utilize the principle that a display is obtained by controlling the orientation direction of liquid crystals retained between transparent electrodes by applying an electric field to them. The electrodes of the present invention can be used as such transparent electrodes.

For example, structure of color liquid crystal display of TFT type comprises 6 parts, i.e., back lights, first polarizer, TFT substrate, liquid crystals, color filter substrate and second polarizer. It is necessary to provide transparent electrodes on the TFT substrate and the color filter substrate to control the orientation direction of the liquid crystals. The transparent electrode of the present invention can be formed on both of the TFT substrate and the color filter substrate by the method described above. The transparent electrodes of the present invention are highly suitable for electrodes provided on TFT substrates or color filter substrates because they show high transparency and electro-conductivity.

The transparent electrodes of the present invention may also be used as electrodes for EL displays. EL displays are classified into various types such as distributed type, Remosen type, double insulation structure type and the like and all of them have a basic structure where an EL luminescent layer is retained between a transparent electrode and a back electrode. The electrodes of the present invention are particularly suitable for such a transparent electrode.

The electrodes of the present invention are also excellent as electrodes for solar cells since they show high transparency and electro-conductivity. While solar cells are classified into various types such as pn junction type, Shottky barrier type, hetero junction type, hetero face junction type, pin type and the like, all of these solar cells have a basic structure where a semi-conductor or an insulator is retained between a transparent electrode and a back electrode. Since solar cells are elements for converting light energy into electricity by utilizing the photovoltaic effect at semi-conductor interfaces, it is required to lead light of spectrum as wide as possible to the semi-conductor interface and hence transparency of the transparent electrodes must be high. Further, since the transparent electrodes of solar cell have a function to collect photogenerated carriers generated at the semi-conductor interface and lead them to terminals, the transparent electrodes must have high electro-conductivity to collect the photogenerated carriers as effectively as possible. Since the transparent electrode of the present invention can lead light of a wide spectrum covering all of the visible region including light of a wavelength shorter than 450 nm to semi-conductor interfaces and, moreover, since they show high electro-conductivity, they are excellent as electrodes for solar cells.

Method for producing the electro-conductive oxides and the electrodes

The electro-conductive oxides of the first embodiment can be produced by preparing an oxide in a conventional manner and introducing oxygen deficit into it. The preparation of the oxide itself can be carried out by a sintering technique, thin film technique or the like. When the preparation of the oxide is carried out by a sintering technique or the like, oxygen deficit may be introduced upon the formation of the oxide depending on the process conditions.

The oxides can be produced in the sintering technique by weighing and mixing raw materials such as indium oxide, gallium oxide, magnesium oxide, aluminium oxide and zinc oxide so that a resulting mixture has a desired composition, molding the mixture into a desired shape and sintering it at a temperature of from 1000° C. to 1700° C. for 1 to 48 hours. When the temperature is below 1000° C., the reaction cannot proceed and hence the electro-conductive oxides of the present invention cannot be obtained. When the temperature is above 1700° C., some materials such as indium oxide and zinc oxide are vaporized and thereby the composition may be unacceptably changed.

The electrodes of the present invention can be manufactured by a thin film technique.

Representative examples of the thin film technique are, for example, CVD techniques, injection spray control techniques, vacuum deposition techniques, ion plating techniques, MBE techniques and sputtering techniques. Examples of the CVD techniques include, for example, thermal CVD, plasma CVD, MOCVD and photo assisted CVD.

Chemical processes such as CVD techniques and injection spray control techniques require simpler installations compared with physical processes such as vacuum deposition techniques and sputtering techniques and therefore suitable for the production of substrates of a large size. Further, since drying or sintering step for accelerating reactions or stabilizing physical properties requires a heat treatment at 350° to 500° C., they are suitably used to produce oxides directly on glass substrates. However, they are not suitable for the case where oxides are formed on various underlying layers or on color filters and TFT elements.

Because the physical processes require a low temperature of 150° to 300° C. for the film formation, they are suitable for not only the direct production on glass substrates but also the production on various underlying layers or on color filters and TFT elements. Among them, sputtering techniques are particularly preferred because, for example, they show high productivity and make possible to form a uniform film even on substrates of a large area.

Orientation properties of produced oxide films may vary depending on the technique used for the production of films and conditions used therein.

For example, in order to produce an oriented oxide thin film by a sputtering technique, it is suitable to carry out the process by heating transparent substrates to a temperature of from 100° C. to 900° C. under a pressure of from $5 \times 10^{-4}$ to 1 Torr.

As the sputtering target, sintering bodies of metals or oxides and molded bodies of metal or oxide powders can be used.

In the case of oxides of the first embodiment, it is suitable to use as a target an oxide of the general formula: $M(1)_x M(2)_y In_z O_{(x+3y/2+3z/2)}$ wherein $M(1)$ is at least one element selected from magnesium and zinc, $M(2)$ is at least one element selected from aluminium and gallium, the ratio $(x:y)$ is from 0.1 to 2.2:1 and the ratio of $(z:y)$ is 0.4 to 1.8:1.

By using the above-mentioned oxide as a target and carrying out the film formation under the conditions of a substrate heating temperature of from 100° to 900° C. and a pressure of from $5 \times 10^{-4}$ to 1 Torr, it is possible to produce on a transparent substrate an electro-conductive layer comprising an oxide of the first embodiment of the present invention wherein faces (00n), where n is a positive integer, of the oxide are oriented in substantially parallel with the surface of the transparent substrate.

In the CVD techniques, it is possible to use, as a source of metal elements, organic metals such as $In(CH_3)_3$, $In(C_2H_5)_3$, $In(C_{5H7}O_2)_3$, $In(C_{11}H_9O_2)_3$, $Ga(CH_3)_3$, $Ga(C_2H_5)_3$, $Zn(CH_3)_2$, $Zn(C_2H_5)_2$, $Al(CH_3)_3$, $Al(C_2H_5)_3$, $Mg(CH_3)_2$ and $Mg(C_2H_5)_2$, chlorides such as $InCl_3$, $GaCl_3$, $ZnCl_2$, $AlC_3$, $MgCl_2$ and the like. As a source of oxygen, air, $O_2$, $H_2O$, $CO_2$, $N_2O$ and the like can be used.

The film formation by ion plating techniques can be carried out by evaporating a mixture or a sintered body of raw materials of metals or oxides by ohmic-resistance heating, high frequency heating, electron impact or the like and ionizing it by DC discharge, RF discharge, electron impact or the like. When metals are used as the raw materials, intended oxide films can be obtained by carrying out the film formation in a flow of air, $O_2$, $H_2O$, $CO_2$, $N_2O$ or the like.

The film formation by vacuum deposition techniques can be carried out by evaporating a mixture or a sintered body of raw materials of metals or oxides by ohmic-resistance heating, high frequency heating, electron impact, laser impact or the like under a pressure of $10^{-3}$ to $10^{-6}$ Torr to form a film on a substrate. When metals are used as the raw materials, intended oxide films can be obtained by carrying out the film formation in a flow of air, $O_2$, $H_2O$, $CO_2$, $N_2O$ or the like.

Also in CVD, ion plating and vacuum deposition techniques, oriented oxide films can be formed by suitably selecting the conditions of the film formation.

Electro-conductivity of the electro-conductive oxides of the first embodiment of the present invention including the electro-conductive layers of the electrodes can be obtained by introducing oxygen deficit into the oxides represented by the general formula: $M(1)_xM(2)_yIn_zO_{(x+3y/2+3z/2)}$ obtained by a sintering technique or thin film technique. Generally, oxygen deficit of oxides can be realized by drawing oxygens out of the oxides. Oxygen atoms can be drawn out to obtain oxygen deficit by, for example, heating the oxides in a reducing or inert gas atmosphere. The heat and/or reducing treatment may be carried out at a temperature of from 100° to 1100° C., preferably from 300° to 900° C.

Oxides with oxygen deficit can be also obtained by controlling oxygen partial pressure during the sintering of oxides or the film formation.

The amount of oxygen deficit can be adjusted by introducing oxygen deficit upon formation of the oxides and then drawing out oxygens.

The electro-conductive oxides according to the second embodiment of the present invention are basically produced, like the electro-conductive oxides of the first embodiment, by preparing an oxide in a conventional manner and, if necessary, introducing oxygen deficit into the obtained oxide. The preparation of the oxide itself can be carried out by a sintering technique, thin film technique or the like. When the preparation of the oxide is carried out by a sintering technique or the like, oxygen deficit may be introduced upon the formation of the oxide depending on the process conditions. Examples of the thin film technique are those methods mentioned in the explanation about the electro-conductive oxides of the first embodiment hereinbefore.

The oxides containing germanium as the replacing element can be produced in a sintering technique by weighing and mixing raw materials such as indium oxide, gallium oxide, zinc oxide and germanium oxide so that a resulting mixture has a composition, for example, $In_2Ga_2Zn_{0.99}Ge_{0.01}O_7$, molding the mixture into a desired shape and sintering it at a temperature of, for example, from 1000° C. to 1700° C. for 1 to 48 hours in air or inert gas atmosphere.

When the oxides are produced by a thin film technique, for example, a sputtering technique, it is suitable to use, as a target, an oxide represented by the general formula: $M(1)_xM(2)_yIn_zO_{(x+3y/2+3z/2)}$ wherein M(1) is at least one element selected from magnesium and zinc, M(2) is at least one element selected from aluminium and gallium, the ratio (x:y) is within a range of 0.1 to 2.2:1 and the ratio (z:y) is within a range of 0.4 to 1.8:1, in which a part of at least one of M(1), M(2) and In is replaced with one or more other elements and the elements replacing M(1) are of di- or higher valence and the elements replacing M(2) and In are of tri- or higher valence.

For example, to form a layer having a composition of $In_2Ga_2Zn_{0.99}Ge_{0.01}O_7$, a sintered body or a molded body of mixed powder having a similar composition may be used as a target.

In order to produce an oriented oxide thin film by a sputtering technique, it is suitable to form an oxide film on a transparent substrate by using the above-described oxide as a target and heating the transparent substrate to a temperature of from 100° C. to 900° C. under a pressure of from $5\times10^{-4}$ to 1 Torr.

By the method described above, obtained is an electrode comprising an electro-conductive layer comprising an electro-conductive oxide and having a crystalline structure where faces (00n), where n is a positive integer, of the electro-conductive oxide are oriented in substantially parallel with the surface of the transparent substrate.

Oxygen deficit can be introduced, like in the first embodiment of the present invention, for example, by drawing oxygen atoms out of oxide. In addition, when the electro-conductive oxides of the present invention are produced by, for example, a sintering technique, they are likely to inherently have oxygen deficit. Obviously, the amount of oxygen deficit can be adjusted by carrying out an additional step of drawing out oxygen atoms. Oxygen atoms can be drawn out to introduce oxygen deficit, for example, by heating the oxides in a reducing or inert gas atmosphere.

The electro-conductive oxides according to the third embodiment of the present invention are produced, like the electro-conductive oxides of the first embodiment, basically by preparing an oxide having a desired composition represented by the general formula: $M(1)_xM(2)_yIn_zO_{(x+3y/2+3z/2)}$, implanting cations into the obtained oxide and, optionally, introducing oxygen deficit into it. The preparation of the oxide itself can be carried out by a sintering technique, thin film technique or the like. When the preparation of the oxide is carried out by a sintering technique, oxygen deficit may be introduced upon the formation of the oxide depending on the process conditions. Examples of the thin film technique are those methods mentioned in the explanation about the electro-conductive oxides of the first embodiment hereinabove.

An oxide represented by $In_2Ga_2ZnO_7$ and implanted with cations can be produced, when the oxygen deficit amount (d) is 0, by producing an oxide represented by $In_2Ga_2ZnO_7$ in the same manner as in the production of the electro-conductive oxides of the first embodiment and implanting suitable cations into it. Further, when the oxygen deficit amount (d) exceeds 0, such a compound can be produced by producing an oxide represented by $In_2Ga_2ZnO_{7-d}$ in the same manner as used in the preparation of the oxides of the first embodiment and implanting suitable cations into it, or by producing an oxide represented by $In_2Ga_2ZnO_7$, then implanting suitable cations into it and drawing oxygen atoms out of it.

The above-described procedure may be similarly used for the production of electrodes comprising an electroconductive layer of electro-conductive oxides according to the third embodiment.

Cations are implanted by an ion implantation technique. The ion implantation technique may be the same as those used for introducing impurity into solid materials in the manufacturing of VLSI and the like. Cation implantation can be achieved by ionizing elements corresponding to cations to be implanted, accelerating them to more than several tens of keV and implanting them into the oxide.

Implanted cations enter into crystal lattice to form a solid solution and provide carrier electrons in conduction bands to show electro-conductivity. When the oxides do not have oxygen deficit, the amount of implanted cations is preferably selected so that electrons in an amount of $1 \times 10^{18}/cm^3$ to $1 \times 10^{22}/cm^3$ are implanted into conduction bands. When the oxides have oxygen deficit, the amount of implanted cations is preferably selected so that the sum of the amounts of carrier electrons generated by oxygen deficit and cation implantation falls within the range defined above.

When the amount of carrier electrons is less than $1 \times 10^{18}/cm^3$, satisfactory electro-conductivity cannot be obtained. When it exceeds $1 \times 10^{22}/cm^3$, absorption in the visible region is caused by plasma oscillation and transparency is deteriorated. The amount of carrier electrons is preferably in a range of from $1 \times 10^{19}/cm^3$ to $5 \times 10^{21}/cm^3$.

EXAMPLES

The present invention will be further illustrated in detail by the following working examples.

Example 1-1

Powders of $In_2O_3$ (High Purity Chemicals Co., Ltd., 99.99% purity), $Ga_2O_3$ (High Purity Chemicals Co., Ltd., 99.99% purity) and ZnO (High Purity Chemicals Co., Ltd., 99.99% purity were weighed and mixed so that the resulting mixture contained the metals in a ratio shown in Table 1. The weighed powder mixture was charged in a polyamide container having 500 ml volume, added with 200 g of zirconia beads having a diameter of 2 mm, and wet blended for 1 hour by means of an epicyclic ball mill (Fritsch Japan Co., Ltd.). The dispersion medium was methanol. The mixed powder was charged in an alumina crucible and calcined in air at 1000° C. for 5 hours and again ground by using the epicyclic ball mill for 1 hour. Thus obtained calcined powder was molded by uniaxial compression (100 kg/cm²) into a disc sample having a diameter of 20 mm, which was sintered in air at 1400° C. for 2 hours to give a sintered body. This sintered body was further heated to 880° C. for 2 hours in an argon atmosphere. Structure of the product was analyzed by an X-ray diffraction analyzer (MXP 18, Mac Science Co., Ltd.) and it was confirmed that an oxide represented by the formula: $In_2Ga_2ZnO_7$ had been produced.

In order to confirm electro-conductivity of the product, an electro-conductive resin material K-1058 (Fujikura Kasei Co., Ltd) was applied on four spots of the circumference of the disc sample and the sample was heated in an electric furnace maintained at 850° C. for 6 minutes to form an electrode. Lead wires were soldered to this electrode, and electro-conductivity and amount of carrier electrons were determined by a van der Pauw technique electro-conductivity measuring apparatus.

To estimate light absorption properties of the product, the disc sample was mounted on Model 330 spectrophotometer (Hitachi Electric Co., Ltd.) and absorption was measured by the diffuse reflection method while scanning from a wavelength of 500 nm to the shorter wavelength side. A wavelength at which the strength of the reflected light corresponds to 50% of that of incident light was considered an absorption edge wavelength.

Oxygen deficit was obtained as follows. The sintered sample was ground, intimately mixed with carbon powder and placed in a quartz tube furnace. After evacuation to vacuum, Ar gas was flown into the furnace and it was heated to 600° C. Amount of carbon dioxide contained in the exhausted Ar gas was determined by infrared absorption spectrum analysis and the oxygen deficit was calculated from the amount.

Oxygen deficit, electro-conductivity, fundamental absorption edge wavelength and amount of carrier electrons determined as described above are shown in Table 1.

TABLE 1

| Atomic ratio | | | Oxygen deficit | Electro-conductivity | Absorption edge | Amount of carrier electrons |
|---|---|---|---|---|---|---|
| In | Ga | Zn | (d) | (S/cm) | (nm) | (/cm³) |
| 2.0 | 2.0 | 1.0 | $5 \times 10^{-3}$ | 1550 | 420 | $5 \times 10^{20}$ |

Examples 1-2 to 1-25

Powders of $In_2O_3$ (High Purity Chemicals Co., Ltd., 99.99% purity), $Ga_2O_3$ (High Purity Chemicals Co., Ltd., 99.99% purity), ZnO (High Purity Chemicals Co., Ltd., 99.99% purity), $SnO_2$ (High Purity Chemicals Co., Ltd., 99.99% purity), $SiO_2$ (High Purity Chemicals Co., Ltd., 99.99% purity), $TiO_2$ (High Purity Chemicals Co., Ltd., 99.99% purity), $V_2O_5$ (High Purity Chemicals Co., Ltd., 99.99% purity), $GeO_2$ (High Purity Chemicals Co., Ltd., 99.99% purity), $ZrO_2$ (High Purity Chemicals Co., Ltd., 99.99% purity), $MoO_3$ (High Purity Chemicals Co., Ltd., 99.99% purity), $Nb_2O_5$ (High Purity Chemicals Co., Ltd., 99.99% purity) and $Ta_2O_5$ (High Purity Chemicals Co., Ltd., 99.99% purity) were weighed and mixed so that the resulting mixtures contained the metals in the ratios shown in Table 2 and disc samples were prepared in the same manner as in Example 1-1. Electro-conductivity, fundamental absorption edge wavelength and amount of carrier electrons of these samples are shown in Table 2.

TABLE 2

| Ex. | Replacing element | Atomic ratio | | | Electro-conductivity (S/cm) | Absorption edge (nm) | Amount of carrier electrons (/cm³) |
|---|---|---|---|---|---|---|---|
| | | In | Ga | Zn | | | |
| 1-2 | Sn | 0.002 | 1.998 | 2.000 | 1.000 | 1020 | 420 | $4 \times 10^{20}$ |
| 1-3 | Sn | 0.005 | 1.995 | 2.000 | 1.000 | 1210 | 420 | $5 \times 10^{20}$ |
| 1-4 | Sn | 0.010 | 1.990 | 2.000 | 1.000 | 1230 | 420 | $5 \times 10^{20}$ |
| 1-5 | Sn | 0.020 | 1.980 | 2.000 | 1.000 | 1110 | 420 | $5 \times 10^{20}$ |
| 1-6 | Sn | 0.040 | 1.960 | 2.000 | 1.000 | 1080 | 420 | $4 \times 10^{20}$ |
| 1-7 | Ge | 0.002 | 2.000 | 1.998 | 1.000 | 1040 | 420 | $4 \times 10^{20}$ |
| 1-8 | Ge | 0.005 | 2.000 | 1.995 | 1.000 | 1250 | 420 | $5 \times 10^{20}$ |
| 1-9 | Ge | 0.010 | 2.000 | 1.990 | 1.000 | 1360 | 420 | $5 \times 10^{20}$ |
| 1-10 | Ge | 0.020 | 2.000 | 1.980 | 1.000 | 1410 | 420 | $5 \times 10^{20}$ |
| 1-11 | Ge | 0.040 | 2.000 | 1.960 | 1.000 | 1500 | 420 | $5 \times 10^{20}$ |
| 1-12 | Al | 0.002 | 2.000 | 2.000 | 0.998 | 1120 | 420 | $4 \times 10^{20}$ |
| 1-13 | Al | 0.005 | 2.000 | 2.000 | 0.995 | 1210 | 420 | $4 \times 10^{20}$ |
| 1-14 | Al | 0.010 | 2.000 | 2.000 | 0.990 | 1280 | 420 | $4 \times 10^{20}$ |
| 1-15 | Al | 0.020 | 2.000 | 2.000 | 0.980 | 1270 | 420 | $4 \times 10^{20}$ |
| 1-16 | Al | 0.040 | 2.000 | 2.000 | 0.960 | 1150 | 420 | $4 \times 10^{20}$ |
| 1-17 | Si | 0.010 | 2.000 | 1.990 | 1.000 | 1080 | 420 | $4 \times 10^{20}$ |
| 1-18 | Ti | 0.010 | 2.000 | 1.990 | 1.000 | 1240 | 420 | $4 \times 10^{20}$ |

TABLE 2-continued

| | | Atomic ratio | | | Electro-conductivity (S/cm) | Absorption edge (nm) | Amount of carrier electrons (/cm$^3$) |
|---|---|---|---|---|---|---|---|
| Ex. | Replacing element | In | Ga | Zn | | | |
| 1-19 | V | 0.010 | 2.000 | 1.990 | 1.000 | 1150 | 420 | 4 × 10$^{20}$ |
| 1-20 | Ge | 0.010 | 2.000 | 1.990 | 1.000 | 1280 | 420 | 5 × 10$^{20}$ |
| 1-21 | Zr | 0.010 | 2.000 | 1.990 | 1.000 | 1110 | 420 | 4 × 10$^{20}$ |
| 1-22 | V | 0.010 | 2.000 | 2.000 | 0.090 | 1070 | 420 | 4 × 10$^{20}$ |
| 1-23 | Mo | 0.010 | 2.000 | 2.000 | 0.090 | 1090 | 420 | 4 × 10$^{20}$ |
| 1-24 | Nb | 0.010 | 2.000 | 2.000 | 0.090 | 1210 | 420 | 5 × 10$^{20}$ |
| 1-25 | Ta | 0.010 | 2.000 | 2.000 | 0.090 | 1180 | 420 | 5 × 10$^{20}$ |

Example 1-26

A molded disc having a diameter of 25 mm was prepared from the calcined powder prepared in Example 1-1 by uniaxial compression (100 kg/cm$^2$) and it was sintered in air at 1300° C. for 24 hours to yield a sintered body. The sintered body, of which surface had been polished, was fixed as a sputtering target on a backing plate with adhesive. This was mounted on a Model BC1457 sputtering apparatus (ULVAC Japan Co., Ltd.). An Ar/O$_2$ gas (Ar/O$_2$ ratio=40/10) was introduced into the apparatus and RF power of 180 W was inputted to form a thin film of a thickness of about 2000 Å on a quartz glass substrate heated to 500° C. This was heat to 400° to 1000° C. in air and then heated to 600° C. for 2 hours under an argon atmosphere.

Structure of the product was analyzed by the X-ray diffraction analyzer used in Example 1-1 and it was confirmed that the crystalline structure of In$_2$Ga$_2$ZnO$_7$ was produced. Oxygen deficit amount (d) was 5×10$^{-2}$/cm$^2$.

Electro-conductivity and fundametal absorption edge wavelength of the product was determined in the same manner as in Example 1-1. However, since this sample was not a sintered body, the measurement of fundamental absorption edge was carried out by the light transmission method using the apparatus used in Example 1-1 and a wavelength at which light transmission began to decrease was considered fundamental absorption edge wavelength. Electro-conductivity, fundamental absorption edge wavelength, transmission for 400 nm light and amount of carrier electrons obtained as described above are shown in Table 3.

Example 1-27

A thin film was prepared in the same manner as described in Example 1-26. However, since the thin film of this example was not subjected to the heat treatment in an argon atmosphere, it did not show electro-conductivity at that stage. H$^+$ ions were implanted into the sample in an amount of 3×10$^{16}$ ions/cm$^2$ at a doping rate of about 3 μA/cm$^2$ and then structural analysis was carried out with the X-ray diffraction apparatus used in Example 1-26 to confirm that the crystalline structure of In$_2$Ga$_2$ZnO$_7$ was maintained. Electro-conductivity, fundamental absorption edge wavelength, transmission for 400 nm light and amount of carrier electrons obtained in the same manner as in Example 1-26 are shown in Table 3.

Comparative Example 1-1

Using an ITO target containing 5% Sn, an ITO thin film having a thickness of about 2000 Å was formed on a quartz glass substrate in the same manner as in Example 1-26. Electro-conductivity, fundamental absorption edge wavelength, transmission for 400 nm light and amount of carrier electrons of this ITO thin film were determined and are shown in Table 3.

Though the thin films of Examples 1-26 and 1-27 showed electro-conductivity comparable to that of the thin film of Comparative Example 1-1, they had the absorption edge wavelengths in the shorter wavelength region. Therefore, the thin films of Examples 1-26 and 1-27 showed markedly higher transmission as to the light of 400 nm and it showed substantially no coloration, whereas the thin film of Comparative Example 1-1 clearly showed coloration in yellow.

TABLE 3

| | Atomic ratio | | | Electro-condutivity (S/cm) | Absorption edge (nm) | Transmission 400 nm (%) | Amount of carrier electrons (/cm$^3$) |
|---|---|---|---|---|---|---|---|
| Example | In | Ga | Zn | | | | |
| 1-26 | 2.0 | 2.0 | 1.0 | 1470 | 385 | 87 | 4 × 10$^{20}$ |
| 1-27 | 2.0 | 2.0 | 1.0 | 1120 | 385 | 85 | 3 × 10$^{20}$ |
| 1-1* | ITO (Sn 5 mol %) | | | 1240 | 405 | 42 | 5 × 10$^{20}$ |

*Comparative Example

Example 1-28

A thin film having a thickness of 2000 Å was prepared on a color filter substrate heated to 300° C. by using the sputtering target and the sputtering apparatus of Example 1-26, introducing an Ar/O$_2$ gas (Ar/O$_2$ratio=40/10) and inputting RF Power Of 100 W for 40 minutes. This was heated to 300° C. in air for 24 hours and structural analysis was carried out with the X-ray diffraction apparatus used in Example 1-26 to confirm that the crystalline structure of In$_2$Ga$_2$ZnO$_7$ was produced.

The product was further subjected to a heat treatment at 300° C. for 24 hours to introduce oxygen deficit into it. Oxygen deficit amount (d) was 2×10$^{-2}$/cm$^2$.

Electro-conductivity, fundamental absorption edge wavelength, transmission (at 400 nm) and amount of carrier electrons were determined in the same manner as in Example 1-26 and are shown in Table 4.

Comparative Example 1-2

Using an ITO target containing 5% Sn, an ITO thin film having a thickness of about 2000 Å was formed on a color filter substrate in the same manner as in Example 1-28. This was heated to 300° C. in air for 24 hours and further subjected to a heat treatment at 300° C. in an argon atmosphere for 24 hours. Electro-conductivity, fundamental absorption edge wavelength, transmission for 400 nm light and amount of carrier electrons of this ITO thin film were determined and ar e shown in Table 4.

The thin film electrode of Example 1-28 showed electro-conductivity comparable to that of the thin film of Comparative Example 1-2. However, the thin film electrode of Example 1-28 had the absorption edge wavelengths in the shorter wavelength region.

TABLE 4

| | Atomic ratio | | | Electro-condutivity (S/cm) | Absorption edge (nm) | Transmission 400 nm (%) | Amount of carrier electrons (/cm$^3$) |
|---|---|---|---|---|---|---|---|
| Example | In | Ga | Zn | | | | |
| 1-28 | 2.0 | 2.0 | 1.0 | 650 | 390 | 76 | $4 \times 10^{20}$ |
| 1-2* | ITO (Sn 5 mol %) | | | 640 | 415 | 22 | $5 \times 10^{20}$ |

*Comparative Example

Examples 2-1 to 2-9

Powders of MgCO$_3$ (Kanto Chemical Co., Ltd., 42.7% purity in terms of MgO), ZnO (High Purity Chemicals Co., Ltd., 99.99% purity), Al$_2$O$_3$ (High Purity Chemicals Co., Ltd., 99.99% purity), Ga$_2$O$_3$ (High Purity Chemicals Co., Ltd., 99.99% purity) and In$_2$O$_3$ (High Purity Chemicals Co., Ltd., 99.99% purity) were weighed and mixed so that the resulting mixtures contained the metals in the ratios shown in Table 5. The weighed powder mixture was charged in a polyamide container having 500 ml volume with 200 g of zirconia beads having a diameter of 2 mm, added with 20 g of methanol and wet blended for 1 hour by means of an epicyclic ball mill (Fritsch Japan Co., Ltd.). The mixed powder was charged in an alumina crucible and calcined in air at 1000° C. for 5 hours and again ground using the epicyclic ball mill for 1 hour. Thus obtained calcined powder was molded by uniaxial compression (100 kg/cm$^2$) into disc samples having a diameter of 20 mm, which were sintered in air at 1400° C. to 1700° C. for 2 hours to give sintered bodies having a relative density of more than 90%.

Structures of the sintered bodies were analyzed by an X-ray diffraction apparatus (RADIIB, Rigaku Denki Co., Ltd.) and it was confirmed that they are single-phase samples composed solely of the crystalline structure of YbFe$_2$O$_4$-type.

In order to implant electrons, the sintered bodies were wrapped to be made into disc samples having a thickness of about 500 µm and subjected to a reducing treatment in a hydrogen atmosphere at 600° C. to 800° C. Thus, the electro-conductive oxides of the present invention were obtained.

In order to confirm electro-conductivity of the products, gold was deposited on the reduced disc samples at four spots on the circumference of each disc sample to make them electrodes. Lead wires were fixed to the electrodes with silver paste and the other ends of the lead wire were connected to a van der Pauw technique electro-conductivity measuring apparatus to determine electro-conductivity.

To estimate light absorption properties of the products, the disc samples having been subjected to the reducing treatment was mounted on Model 330 spectrophotometer (Hitachi Electric Co., Ltd.) and absorption was measured by scanning from a wavelength of 500 nm to the shorter wavelength side. A wavelength at which the strength of the reflected light corresponds to 50% of that of incident light was considered an absorption edge wavelength.

Electro-conductivity and absorption edge wavelength determined as described above are shown in Table 5.

TABLE 5

| Example | Mg | Zn | Alq | Ga | In | Electro-conductivity | Absorption edge | Oxygen deficit amount |
|---|---|---|---|---|---|---|---|---|
| 2-1 | 1.0 | 0.0 | 1.0 | 0.0 | 1.0 | 110 S/cm | 330 nm | $5 \times 10^{-3}$ |
| 2-2 | 1.0 | 0.0 | 0.5 | 0.5 | 1.0 | 98 | 332 | $4 \times 10^{-3}$ |
| 2-3 | 1.0 | 0.0 | 0.0 | 1.0 | 1.0 | 115 | 335 | $5 \times 10^{-3}$ |
| 2-4 | 0.0 | 1.0 | 1.0 | 0.0 | 1.0 | 132 | 375 | $6 \times 10^{-3}$ |
| 2-5 | 0.0 | 1.0 | 0.5 | 0.5 | 1.0 | 121 | 375 | $5 \times 10^{-3}$ |
| 2-6 | 0.0 | 1.0 | 0.0 | 1.0 | 1.0 | 127 | 372 | $5 \times 10^{-3}$ |
| 2-7 | 0.5 | 0.5 | 1.0 | 0.0 | 1.0 | 122 | 356 | $5 \times 10^{-3}$ |
| 2-8 | 0.5 | 0.5 | 0.5 | 0.5 | 1.0 | 117 | 350 | $5 \times 10^{-3}$ |
| 2-9 | 0.5 | 0.5 | 0.0 | 1.0 | 1.0 | 120 | 351 | $5 \times 10^{-3}$ |

Examples 2-10 to 2-13

Powders of MgCO$_3$ (Kanto Chemical Co., Ltd., 42.7% purity in terms of MgO), Ga$_2$O$_3$ (High Purity Chemicals Co., Ltd., 99.99% purity), In$_2$O$_3$ (High Purity Chemicals Co., Ltd., 99.99% purity) and Al$_2$O$_3$ (High Purity Chemicals Co., Ltd., 99.99% purity) were weighed and mixed so that the resulting mixtures contained the metals in the ratios shown in Table 6. Each of the weighed powder mixtures was charged in a polyamide container having 500 ml volume with 200 g of zirconia beads having a diameter of 2 mm, added with 20 g of methanol and wet blended for 1 hour by means of an epicyclic ball mill (Fritsch Japan Co., Ltd.). The mixed powder was charged in an alumina crucible and calcined in air at 1000° C. for 5 hours and again ground using the epicyclic ball mill for 1 hour. Thus obtained calcined powder was molded by uniaxial compression (100 kg/cm$^2$) into disc samples having a diameter of 20 mm, which were sintered in an argon atmosphere at 1200° to 1700° C. for 2 hours to give sintered bodies having a relative density of more than 90%.

Structures of the sintered bodies were analyzed in the same manner as in Example 2-1 and it was confirmed that they have the crystalline structure of YbFe$_2$O$_4$-type. Then, the surfaces of the sintered bodies were wrapped to made them into disc samples having a thickness of about 500 µm. In order to evaluate electro-conductivity and absorption edge, electro-conductivity and light absorption properties were determined in the same manner as in Example 2-1. The obtained electro-conductivities and absorption edge wavelengths are shown in Table 6.

TABLE 6

| Example | Mg | Al | Ga | In | Electro-conductivity | Absorption edge |
|---|---|---|---|---|---|---|
| 2-10 | 0.99 | 0.01 | 1.0 | 1.0 | 112 S/cm | 331 nm |
| 2-11 | 0.97 | 0.03 | 1.0 | 1.0 | 122 | 332 |
| 2-12 | 0.95 | 0.05 | 1.0 | 1.0 | 124 | 330 |
| 2-13 | 0.93 | 0.07 | 1.0 | 1.0 | 121 | 331 |

Examples 2-14 to 2-21

Powders of ZnO (High Purity Chemicals Co., Ltd., 99.99% purity), Ga$_2$O$_3$ (High Purity Chemicals Co., Ltd., 99.99%), In$_2$O$_3$ (High Purity Chemicals Co., Ltd., 99.99%), Al$_2$O$_3$ (High Purity Chemicals Co., Ltd., 99.99%), SiO$_2$ (High Purity Chemicals Co., Ltd., 99.99%), GeO$_2$ (Kanto Kagaku Co., Ltd., 99.99%), SnO$_2$ (High Purity Chemicals Co., Ltd., 99.99%) and Sb$_2$O$_3$ (Wako Junyaku Kogyo Co., Ltd., 95%) were weighed and mixed to replace 0.5% by mole of the cations of ZnGaInO$_4$, Zn, Ga or In so that the resulting mixtures have the compositions shown in Table 7.

The powders were mixed, calcined, molded and sintered in the same manner as in Examples of 2-10 to 2-13 to yield sintered bodies having a relative density of not less than 90% and it was confirmed that they have the crystalline structure of $YbFe_2O_4$-type. Then, the surfaces of the sintered bodies were wrapped to made them into disc samples having a thickness of about 500 μm. In order to evaluate electro-conductivity and absorption edge, electro-conductivity and light absorption properties were determined in the same manner as in Example 2-1. The obtained electro-conductivities and absorption edge wavelengths are shown in Table 7.

TABLE 7

| Example | Targeted Composition | Electro-conductivity | Absorption edge |
|---|---|---|---|
| 2-14 | $Zn_{0.995}Al_{0.006}GaInO_4$ | 105 S/cm | 370 nm |
| 2-15 | $Zn_{0.995}Ga_{0.006}GaInO_4$ | 125 | 375 |
| 2-16 | $Zn_{0.995}Si_{0.006}GaInO_4$ | 132 | 372 |
| 2-17 | $Zn_{0.995}Ge_{0.006}GaInO_4$ | 148 | 373 |
| 2-18 | $ZnGa_{0.995}Si_{0.005}InO_4$ | 102 | 372 |
| 2-19 | $ZnGa_{0.995}Ge_{0.005}InO_4$ | 90 | 370 |
| 2-20 | $ZnGaIn_{0.995}Sn_{0.005}O_4$ | 75 | 375 |
| 2-21 | $ZnGaIn_{0.995}Sb_{0.005}O_4$ | 84 | 377 |

Examples 2-22 to 2-30

Calcined powders were prepared in the same manner as in Example 2-1 so that the resulting calcined powders contained metal elements in the ratios shown in Table 8. The powders were molded into discs having a diameter of 25 mm by uniaxial compression (100 kg/cm$^2$) and sintered in air at 1300° C. to 1700° C. for 2 hours to yield sintered bodies having a relative density of not less than 90%. The surfaces of the sintered bodies were polished and they were fixed on backing plates with adhesive as sputtering targets. They were mounted on a Model BC1457 sputtering apparatus (Nippon Shinku Co., Ltd.). An Ar/O$_2$ gas (Ar/O$_2$ ratio=45/5) was introduced into the apparatus and RF power of 180 W was inputted for 40 minutes to form thin amorphous films of a thickness of about 800 Å on a quartz glass substrate heated to 500° C. They were heated to 400 to 800° C. in air. Structural analysis of the products was carried out with the apparatus used in Example 2-1 to confirm that crystals with the YbFe$_2$O$_4$-type structure had been produced.

Then, in order to implant electrons, the crystallized thin film samples were treated in a hydrogen flow at 400° C. to 800° C. to yield the electro-conductive oxides of the present invention. Electro-conductivity and absorption edge wavelength of these electro-conductive oxides were determined in the same manner as in Example 2-1. Absorption edge wavelength was determined by the light transmission method and a wavelength at which the transmission was 50% was considered the absorption edge wavelength. The obtained electro-conductivities and absorption edge wavelengths are shown in Table 8. The results shown in Table 8 clearly demonstrate that the electro-conductive oxides are excellent as electrodes.

TABLE 8

| Example | Mg | Zn | Al | Ga | In | Electro-Conductivity | Absorption edge |
|---|---|---|---|---|---|---|---|
| 2-22 | 1.0 | 0.0 | 1.0 | 0.0 | 1.0 | 90 S/cm | 335 nm |
| 2-23 | 1.0 | 0.0 | 0.5 | 0.5 | 1.0 | 91 | 337 |
| 2-24 | 1.0 | 0.0 | 0.0 | 1.0 | 1.0 | 90 | 330 |
| 2-25 | 0.0 | 1.0 | 1.0 | 0.0 | 1.0 | 92 | 371 |
| 2-26 | 0.0 | 1.0 | 0.5 | 0.5 | 1.0 | 88 | 375 |
| 2-27 | 0.0 | 1.0 | 0.0 | 1.0 | 1.0 | 73 | 379 |
| 2-28 | 0.5 | 0.5 | 1.0 | 0.0 | 1.0 | 92 | 350 |
| 2-29 | 0.5 | 0.5 | 0.5 | 0.5 | 1.0 | 84 | 352 |
| 2-30 | 0.5 | 0.5 | 0.0 | 1.0 | 1.0 | 90 | 355 |

Examples 3-1 to 3-9

Powders of In$_2$O$_3$ (High Purity Chemicals Co. Ltd., 99.99% purity), Ga$_2$O$_3$ (High Purity Chemicals Co., Ltd., 99.99% purity) and ZnO (High Purity Chemicals Co., Ltd., 99.99% purity) were weighed and mixed so that the resulting mixtures contained the metals in the ratios shown in Table 9. The weighed powder mixtures were charged in a polyamide container having 500 ml volume, added with 200 g of zirconia beads having a diameter of 2 mm and wet blended for 1 hour by means of an epicyclic ball mill (Fritsch Japan Co., Ltd.). The dispersion medium was methanol. The mixed powders were charged in an alumina crucible and calcined in air at 1000° C. for 5 hours and again ground for 1 hour using the epicyclic ball mill. Thus obtained calcined powders were molded by uniaxial compression (100 kg/cm$^2$) into discs having a diameter of 20 mm, which were sintered in air at 1400° C. for 2 hours to give sintered bodies. These sintered body were further heated to 880° C. for 2 hours in an argon atmosphere.

Measurements and calculations of of electro-conductivity, absorption edge wavelength and oxygen deficit amount were carried out in the same manner as in Example 1-1. The obtained electro-conductivities, absorption edge wavelengths and oxygen deficit amounts are shown in Table 9.

TABLE 9

| Example | Atomic ratio | | | | | Electro-conductivity | Absorption edge | Oxygen deficit | Amount of carrier electrons |
|---|---|---|---|---|---|---|---|---|---|
| | Zn | Ga | In | x/y | z/y | (S/cm) | (nm) | d | (/cm$^3$) |
| 3-1 | 11 | 47 | 41 | 0.24 | 0.67 | 980 | 390 | $5 \times 10^{-3}$ | $3 \times 10^{20}$ |
| 3-2 | 25 | 39 | 36 | 0.64 | 0.92 | 1420 | 420 | $5 \times 10^{-3}$ | $5 \times 10^{20}$ |
| 3-3 | 33 | 34 | 33 | 0.97 | 0.97 | 2520 | 420 | $5 \times 10^{-3}$ | $5 \times 10^{20}$ |
| 3-4 | 47 | 39 | 24 | 1.63 | 0.82 | 870 | 430 | $5 \times 10^{-3}$ | $3 \times 10^{20}$ |
| 3-5 | 11 | 38 | 52 | 0.28 | 1.38 | 1170 | 400 | $5 \times 10^{-3}$ | $4 \times 10^{20}$ |
| 3-6 | 40 | 27 | 34 | 1.50 | 1.27 | 820 | 430 | $4 \times 10^{-3}$ | $3 \times 10^{20}$ |

TABLE 9-continued

| Example | Atomic ratio | | | | | Electro-conductivity (S/cm) | Absorption edge (nm) | Oxygen deficit d | Amount of carrier electrons (/cm$^3$) |
|---|---|---|---|---|---|---|---|---|---|
| | Zn | Ga | In | x/y | z/y | | | | |
| 3-7 | 7 | 28 | 65 | 0.25 | 2.33 | 970 | 400 | $4 \times 10^{-3}$ | $3 \times 10^{20}$ |
| 3-8 | 34 | 44 | 22 | 0.78 | 0.50 | 950 | 420 | $4 \times 10^{-3}$ | $3 \times 10^{20}$ |
| 3-9 | 16 | 27 | 57 | 0.61 | 2.13 | 780 | 430 | $3 \times 10^{-3}$ | $2 \times 10^{20}$ |

Comparative Examples 3-1 to 3-4

Example 3-1 was repeated except that the powders were mixed so that the resulting mixed powder contained the metals in the ratios shown in Table 10. Results are shown in Table 10.

TABLE 10

| Example | Atomic ratio | | | | | Electro-conductivity (S/cm) | Absorption edge (nm) | Oxygen deficit d | Amount of carrier electrons (/cm$^3$) |
|---|---|---|---|---|---|---|---|---|---|
| | Zn | Ga | In | x/y | z/y | | | | |
| 3-1 | 6 | 36 | 58 | 0.17 | 1.61 | 210 | 390 | $1 \times 10^{-3}$ | $5 \times 10^{19}$ |
| 3-2 | 44 | 16 | 40 | 2.75 | 2.50 | 720 | 460 | $3 \times 10^{-3}$ | $2 \times 10^{20}$ |
| 3-3 | 12 | 72 | 16 | 0.17 | 0.22 | 70 | 370 | $5 \times 10^{-3}$ | $1 \times 10^{19}$ |
| 3-4 | 62 | 30 | 8 | 2.07 | 0.27 | 560 | 430 | $4 \times 10^{-3}$ | $2 \times 10^{20}$ |

Examples 3-10 to 3-14

Powders of $In_2O_3$ (High Purity Chemicals Co., Ltd., 99.99% purity), $Ga_2O_3$ (High Purity Chemicals Co., Ltd., 99.99% purity), ZnO (High Purity Chemicals Co., Ltd., 99.99% purity), $MgCO_3$ (Kanto Kagaku Co., Ltd., 99.99% purity) and $Al_2O_3$ (High Purity Chemicals Co., Ltd., 99.99% purity) were weighed and mixed so that the resulting mixed powders contained the metals in the ratios shown in Table 11 and the powders were treated in the same manner as in Example 3-1. Results are shown in Table 11.

TABLE 11

| Example | Atomic ratio | | | | | | | Electro-conductivity (S/cm) | Absorption edge (nm) | Oxygen deficit ×10$^{-3}$ | Amount of carrier electrons (/cm$^3$) |
|---|---|---|---|---|---|---|---|---|---|---|---|
| | Zn | Mg | Ga | Al | In | x/y | z/y | | | | |
| 3-10 | 25 | | | 39 | 36 | 0.24 | 0.87 | 1360 | 420 | 5 | $5 \times 10^{20}$ |
| 3-11 | | 25 | 39 | | 36 | 0.24 | 0.87 | 920 | 340 | 4 | $3 \times 10^{20}$ |
| 3-12 | | 25 | | 39 | 36 | 0.24 | 0.87 | 910 | 340 | 4 | $3 \times 10^{30}$ |
| 3-13 | 26 | 7 | 33 | | 34 | 1.00 | 1.03 | 1280 | 390 | 5 | $5 \times 10^{20}$ |
| 3-14 | 33 | | 28 | 6 | 33 | 0.97 | 0.97 | 1360 | 420 | 5 | $5 \times 10^{20}$ |

Example 3-15 to 3-24

Powders of $In_2O_3$ (High Purity Chemicals Co., Ltd., 99.99% purity), $Ga_2O_3$ (High Purity Chemicals Co., Ltd., 99.99% purity), ZnO (High Purity Chemicals Co., Ltd., 99.99% purity), $Al_{23}$ (High Purity Chemicals Co., Ltd., 99.99% purity), $SnO_2$ (High Purity Chemicals Co., Ltd., 99.99% purity), $SiO_2$ (High Purity Chemicals Co., Ltd., 99.99% purity), $TiO_2$ (High Purity Chemicals Co., Ltd., 99.99% purity), $V_2O_5$ (High Purity Chemicals Co., Ltd., 99.99% purity), $GeO_2$ (High Purity Chemicals Co., Ltd., 99.99% purity), $ZrO_2$ (High Purity Chemicals Co., Ltd., 99.99% purity), $MoO_3$ (High Purity Chemicals Co., Ltd., 99.99% purity), $Nb_2O_5$ (High Purity Chemicals Co., Ltd., 99.99% purity) and $Ta_2O_5$ (High Purity Chemicals Co., Ltd., 99.99% purity) were weighed and mixed so that the resulting mixed powders contained the metals in the ratios shown in Table 12 and the powders were treated in the same manner as in Example 3-1 to prepare disc samples. Electro-conductivities, fundamental absorption edge wavelengths and amounts of carrier electrons of these samples are shown in Table 12.

TABLE 12

| Example | Atomic ratio | | | | x/y | z/y | Electro-conductivity (S/cm) | Absorption edge (nm) | Amount of carrier electron (/cm³) |
|---|---|---|---|---|---|---|---|---|---|
| | Zn | Ga | In | Other | | | | | |
| 3-15 | 24 | 39 | 36 | Sn 1 | 0.64 | 0.92 | 1580 | 420 | 6 × 10²⁰ |
| 3-16 | 24 | 39 | 36 | Ge 1 | 0.64 | 0.92 | 1620 | 420 | 6 × 10²⁰ |
| 3-17 | 24 | 39 | 36 | Al 1 | 0.64 | 0.92 | 1510 | 420 | 6 × 10²⁰ |
| 3-18 | 24 | 39 | 36 | Si 1 | 0.64 | 0.92 | 1380 | 420 | 6 × 10²⁰ |
| 3-19 | 24 | 39 | 36 | Ti 1 | 0.64 | 0.92 | 1240 | 420 | 5 × 10²⁰ |
| 3-20 | 24 | 39 | 36 | V 1 | 0.64 | 0.92 | 1680 | 420 | 6 × 10²⁰ |
| 3-21 | 24 | 39 | 36 | Zr 1 | 0.64 | 0.92 | 1590 | 420 | 6 × 10²⁰ |
| 3-22 | 24 | 39 | 36 | Mo 1 | 0.64 | 0.92 | 1630 | 420 | 6 × 10²⁰ |
| 3-23 | 24 | 39 | 36 | Nb 1 | 0.64 | 0.92 | 1540 | 420 | 6 × 10²⁰ |
| 3-24 | 24 | 39 | 36 | Ta 1 | 0.64 | 0.92 | 1430 | 420 | 6 × 10²⁰ |

Example 3-25

The calcined powder obtained in Example 3-1 was molded into a disc having a diameter of 25 mm by uniaxial compression (100 kg/cm²) and sintered in air at 1300°0 C. for 24 hours to yield a sintered body. The surface of the sintered body was polished and it was fixed on a backing plate with adhesive as a sputtering target. It was mounted on a Model BC1457 sputtering apparatus (Nippon Shinku Co., Ltd.). An $Ar/O_2$ gas ($Ar/O_2$ ratio=40/10) was introduced into the apparatus and RF power of 180 W was inputted for 40 minutes to form a thin film of a thickness of about 2000 Å on a quartz glass substrate heated to 500° C.

It was heated to 400° to 1000° C. in air and further heated to 880° C. for 2 hours in an argon atmosphere.

Since this sample was not a sintered body, the measurement of absorption edge was carried out by the light transmission method using the apparatus used in Example 3-1 and a wavelength at which light transmission began to decrease was considered absorption edge wavelength. Electro-conductivity, fundamental absorption edge wavelength, transmission for 400 nm light and amount of carrier electrons obtained as described above are shown in Table 13.

Example 3-26

A thin film was prepared in the same manner as described in Example 3-25. However, since the thin film of this example was not subjected to the heat treatment in an argon atmosphere, it did not show electro-conductivity at that stage. H⁺ ions were implanted into the sample in an amount of $3 \times 10^{16}$ ions/cm² at a doping rate of about 3 $\mu$A/cm² and then composition was analyzed by an X-ray diffraction apparatus to confirm that the composition of $Zn_{0.24}GaIn_{0.87}O_{2.55}$ was maintained. Electro-conductivity, absorption edge, transmission for 400 nm light and amount of carrier electrons obtained in the same manner as in Example 3-25 are shown in Table 13.

Example 3-27

A thin film having a thickness of 2000 Å was prepared on a color filter substrate heated to 300° C. by using the sputtering target and the sputtering apparatus of Example 3-25, introducing an $Ar/O_2$ gas ($Ar/O_2$ ratio=40/10) and inputting RF power of 100 W for 40 minutes. This was heated to 300° C. in air for 24 hours and composition analysis was carried out with an X-ray diffraction apparatus to confirm that the composition of $Zn_{0.24}GaIn_{0.87}O_{2.55}$ had been produced.

The product was further subjected to a heat treatment at 300° C. for 24 hours in an argon atmosphere to introduce oxygen deficit into it. Oxygen deficit amount (d) was $2 \times 10^{-2}$/cm².

Electro-conductivity, fundamental absorption edge wavelength, transmission (at 400 nm) and amount of carrier electrons were determined in the same manner as in Example 3-25 and are shown in Table 13.

TABLE 13

| Example | Atomic ratio | | | x/y | z/y | Electro-conductivity (S/cm) | Absorption edge (nm) | Transmission 400 nm (%) | Amount of carrier electrons (/cm³) |
|---|---|---|---|---|---|---|---|---|---|
| | Zn | Ga | In | | | | | | |
| 3-25 | 25 | 39 | 36 | 0.64 | 0.92 | 1210 | 385 | 91 | 5 × 10³⁰ |
| 3-26 | 25 | 39 | 36 | 0.64 | 0.92 | 1380 | 380 | 94 | 6 × 10³⁰ |
| 3-27 | 25 | 39 | 36 | 0.64 | 0.92 | 680 | 390 | 74 | 3 × 10²⁰ |

Example 4-1

A thin film having a thickness of 2000 Å was prepared on a quartz glass substrate by an RF magnetron sputter using a sintered body having a composition of $ZnO/Ga_2O_3/In_2O_3$= 16/43/41 as a sputtering target under the following conditions: $Ar/O_2$ ratio=18/2, pressure=$6 \times 10^{-3}$ Torr and substrate heating temperature=500° C. Composition of the obtained thin film was analyzed with fluorescent X-ray (XRF) and it was found that the film had a composition of Zn/Ga/In=11/47/41 (x/y=0.24, z/y=0.87). Further, when crystallinity was examined by XRD, a diffraction peak was observed only for faces (009) and thus the film was confirmed to have an oriented structure. Electro-conductivity measured by the four probe method was 280 S/cm and absorption edge obtained by measuring transmission was 390 nm.

Example 4-2

A thin film having a thickness of 2000 Å was prepared on a quartz glass substrate by an RF magnetron sputter using a sintered body having a composition of $ZnGaInO_4$ as a sputtering target under the following conditions: $Ar/O_2$ ratio=18/2, pressure=$1 \times 10^{-2}$ Torr and substrate heating temperature=500° C. Composition of the obtained thin film was analyzed with fluorescent X-ray (XRF) and it was found that the film had a composition of Zn/Ga/In=25/39/36 (x/y= 0.64, z/y=0.92). Further, when crystallinity was examined by XRD, a diffraction peak was observed only for faces (009) and thus the film was confirmed to have an oriented structure. Electro-conductivity measured by the four probe method was 240 S/cm and absorption edge obtained by measuring transmission was 385 nm.

Example 4-3

The thin film obtained in Example 4-2 was subjected to a reducing treatment at 600° C. for 1 hour in $N_2/H_2$ gas flow ($N_2/H_2$=98/2). As a result, electro-conductivity of 1370 S/cm was obtained.

Example 4-4

A thin film having a thickness of 1500 Å was prepared on a quartz glass substrate by an RF magnetron sputter using a sintered body having a composition of $ZnO/Ga_2O_3$ratio=40/29/31 as a sputtering target under the following conditions: $Ar/O_2$ ratio=18/2, pressure=$1 \times 10^{-2}$ Torr and substrate heating temperature=500° C. Composition of the obtained thin film was analyzed with fluorescent X-ray (XRF) and it was found that the film had a composition of Zn/Ga/In=33/34/33 (x/y=0.97, z/y=0.97). Further, when crystallinity was examined by XRD, a diffraction peak was observed only for faces (009) and thus the film was confirmed to have an oriented structure. Electro-conductivity measured by the four probe method was 620 S/cm and absorption edge obtained by measuring transmission was 380 nm.

Example 4-5

A thin film having a thickness of 1500 Å was prepared on a quartz glass substrate by an RF magnetron sputter using a sintered body having a composition of $ZnO/Ga_2O_3/In_2O_3$= 45/25/35 as a sputtering target under the following conditions: $Ar/O_2$ ratio=19.5/0.5, pressure=$8\times10^{-3}$ Torr and substrate heating temperature=400° C. The obtained thin film was subjected to a heat treatment in air at 600° C. for 1 hour and then to a reducing treatment in $N_2/H_2$ gas flow ($N_2/H_2$=98/2) at 500° C. for 1 hour. Electro-conductivity measured by the four probe method was 1270 S/cm and absorption edge obtained by measuring transmission was 380 nm.

Composition of the obtained thin film was analyzed with fluorescent X-ray (XRF) and it was found that the film had a composition of Zn/Ga/In=39/28/33 (x/y=1.37, z/y=1.17). Further, when crystallinity was examined by XRD, a diffraction peak was observed only for faces (009) and thus the film was confirmed to have an oriented structure. The results of Examples 4-1 to 4-5 are summarized in Table 14.

TABLE 14

| Example | Zn | Ga | In | x/y | z/y | Electro-conductivity (S/cm) | Absorption edge (nm) |
|---|---|---|---|---|---|---|---|
| 4-1 | 11 | 47 | 41 | 0.24 | 0.87 | 280 | 390 |
| 4-2 | 25 | 39 | 36 | 0.64 | 0.92 | 240 | 385 |
| 4-3 | 25 | 29 | 36 | 0.64 | 0.92 | 1370 | 380 |
| 4-4 | 33 | 34 | 33 | 0.97 | 0.97 | 620 | 380 |
| 4-5 | 39 | 28 | 33 | 1.37 | 1.17 | 1270 | 380 |

Example 4-6

A thin film having a thickness of 5000 Å was prepared on a quartz glass substrate by an RF magnetron sputter using a sintered body having a composition of $ZnO/MgO/Ga_2O_3/In_2O_3$=30/6/30/34 as a sputtering target under the following conditions: $Ar/O_2$ ratio=18/2, pressure=$5\times10^{-1}$ Torr and substrate heating temperature=500° C. Composition of the obtained thin film was analyzed with fluorescent X-ray (XRF) and it was found that the film had a composition of Zn/Mg/Ga/In=26/7/33/34 (x/y=1.00, z/y=1.03). Further, when crystallinity was examined by XRD, diffraction peaks were observed only for faces (003), (006) and (009) and thus the film was confirmed to have an oriented structure.

The obtained thin film was subjected to a reducing treatment in $N_2/H_2$ gas flow ($N_2/H_2$=98/2) at 600° C. for 1 hour. Electro-conductivity measured by the four probe method was 1070 S/cm and absorption edge obtained by measuring transmission was 360 nm.

Example 4-7

A thin film having a thickness of 5000 Å was prepared on a quartz glass substrate by an RF magnetron sputter using a sintered body having a composition of $ZnO/Ga_2O_3/Al_2O_3/In_2O_3$=37/25/5/33 as a sputtering target under the following conditions: $Ar/O_2$ ratio=18/2, pressure=10 mTorr and substrate heating temperature=500° C. Composition of the obtained thin film was analyzed with fluorescent X-ray (XRF) and it was found that the film had a composition of Zn/Ga/Al/In=33/28/6/33 (x/y=0.97, z/y=0.97). Further, when crystallinity was examined by XRD, diffraction peaks were observed only for faces (003), (006) and (009) and thus the film was confirmed to have an oriented structure.

The obtained thin film was subjected to a reducing treatment in $N_2/H_2$ gas flow ($N_2/H_2$=98/2) at 600° C. for 1 hour. Electro-conductivity measured by the four probe method was 1080 S/cm and absorption edge obtained by measuring transmission was 355 nm.

The results of Examples 4-6 and 4-7 are summarized in Table 15.

TABLE 15

| Example | Zn | Mg | Ga | Al | In | x/y | z/y | Electro-conductivity (S/cm) | Absorption edge (nm) |
|---|---|---|---|---|---|---|---|---|---|
| 4-6 | 26 | 7 | 33 | 0 | 34 | 1.00 | 1.03 | 1070 | 360 |
| 4-7 | 33 | 0 | 28 | 6 | 33 | 0.97 | 0.97 | 1080 | 355 |

Examples 4-8 to 4-12

A thin film having a thickness of 2000 Å was prepared on a quartz glass substrate by an RF magnetron sputter using a sintered body having a composition of $ZnO/Ga_2O_3/In_2O_3$=40/29/31 added with $SnO_2$, $GeO_2$, $SiO_2$, $TiO_2$ or $V_2O_5$ as a sputtering target under the following conditions: $Ar/O_2$ ratio=19.5/0.5, pressure=10 mTorr and substrate heating temperature=500° C. Composition of the obtained thin film was analyzed with fluorescent X-ray (XRF) and it was found that the film had a composition of Zn/Ga/In=33/34/33 (x/y=0.97, z/y=0.97) and contained 1% of Sn, Ge, Si, Ti or V.

Further, when crystallinity was examined by XRD, a diffraction peak was observed only for faces (009) and thus the film was confirmed to have an oriented structure. Electro-conductivity measured by the four probe method and absorption edge were shown in Table 16.

TABLE 16

| Exam-ple | Atomic ratio | | | | x/y | z/y | Electro-conducyivity (S/cm) | Absorption edge (nm) |
|---|---|---|---|---|---|---|---|---|
| | Zn | Ga | In | Other | | | | |
| 4-8 | 32 | 34 | 33 | Sn 1 | 0.94 | 0.97 | 1080 | 385 |
| 4-9 | 32 | 34 | 33 | Ge 1 | 0.94 | 0.97 | 960 | 390 |
| 4-10 | 32 | 34 | 33 | Si 1 | 0.94 | 0.97 | 930 | 380 |
| 4-11 | 32 | 34 | 33 | Ti 1 | 0.94 | 0.97 | 1080 | 385 |
| 4-12 | 32 | 34 | 33 | V 1 | 0.94 | 0.97 | 1020 | 390 |

Example 4-13
Production of electrodes by plasma CVD

A quartz glass substrate was placed in a chamber, starting materials, $In(CH_3)_3$, $Ga(CH_3)_3$ and $Zn(C_2H_5)_2$, were introduced into the chamber with an Ar carrier gas, and $N_2O$ gas were also introduced into the chamber. A thin film obtained under the conditions of a substrate heating temperature of 500° C. and a pressure of 1 Torr had a composition of Zn/Ga/Al=29/36/35 (x/y=0.81, z/y=0.97) analyzed with fluorescent X-ray (XRF). When crystallinity was examined by XRD, diffraction peaks were observed only for faces (003), (006) and (009) and thus the film was confirmed to have an oriented structure.

The obtained thin film was subjected to reduction heat treatment in $N_2H_2$ gas flow ($N_2/H_2$=98/2) at 400° C. for 30 minutes. Electro-conductivity measured by the four probe method was as high as 1310 S/cm and absorption edge obtained by measuring transmission was 355 nm.

Example 4-14

Production of electrodes by ion plating

A thin film was prepared on a quartz glass substrate by bombarding with an electron beam a sintered body having a composition of $ZnO/Ga_2O_3/In_2O_3$=40/29/31 to vaporize it and ionizing in by RF discharge between the target and the substrate. The obtained thin film had a composition of Zn/Ga/In=33/38/29 (x/y=0.89, z/y=0.76) analyzed with fluorescent X-ray (XRF). When crystallinity was examined by XRD, a diffraction peak was observed only for faces (009) and thus the film was confirmed to have an oriented structure. The thin film was subjected to a reduction heat treatment in $N_2/H_2$ gas flow ($N_2/H_2$=98/2) at 500° C. for 30 minutes. Electro-conductivity measured by the four probe method was 1110 S/cm and absorption edge obtained by measuring transmission was 380 nm.

Example 4-15

A thin film was prepared on a quartz glass substrate by the electron beam deposition technique using a sintered body having a composition of $ZnO/Ga_2O_3/In_2O_3$=40/29/31 as a target under the condition of substrate heating temperature of 500°πC. The obtained thin film had a composition of Zn/Ga/In=31/40/29 (x/y=0.78, z/y=0.73) analyzed with fluorescent X-ray (XRF). When crystallinity was examined by XRD, a diffraction peak was observed only for faces (009) and thus the film was confirmed to have an oriented structure.

The thin film was subjected to a reduction heat treatment in $N_2/H_2$ gas flow ($N_2/H_2$=98/2) at 500° C. for 30 minutes. Electro-conductivity measured by the four probe method was 1010 S/cm and absorption edge obtained by measuring transmission was 380 nm.

Example 4-16

A thin film was prepared on a quartz glass substrate by an RF magnetron sputter using a sintered body having a composition of $ZnO/Ga_2O_3/In_2O_3$=40/29/31 as a sputtering target under the following conditions: $Ar/O_2$ ratio=18/2, pressure=$1\times10^{-2}$ Torr and substrate heating temperature= 500° C. Composition of the obtained thin film was analyzed with fluorescent X-ray (XRF) and it was found that the film had a composition of Zn/Ga/In=33/34/33 (x/y=0.97, z/y= 0.97). When crystallinity was examined by XRD, a diffraction peak was observed only for faces (009) and thus the film was confirmed to have an oriented structure.

This thin film was implanted with $H^+$ ions at an accelerating voltage of 80 keV to an amount of $2\times10^{16}$ ions/cm$^2$. Electro-conductivity measured by the four probe method was 1320 S/cm and absorption edge obtained by measuring transmission was 370 nm.

According to the present invention, there can be provided novel electro-conductive oxides, which have an absorption edge at a wavelength shorter than 450 nm and electro-conductivity comparable to or higher than that of ITO, and do not cause coloration when they have a thickness larger than that of ITO thin films.

According to the present invention, there can be further provided electrodes useful for liquid crystal displays, EL displays, solar cells and the like by using the above-described electro-conductive oxides. In particular, the electrodes comprising the electro-conductive oxides of the present invention show higher electro-conductivity since the faces (00n), where n is an positive integer, of the electro-conductive oxides are oriented in substantially parallel with the surface of a transparent substrate.

What is claimed is:

1. A liquid crystal display comprising an electrode which comprises a transparent substrate and an electro-conductive layer provided on at least a part of at least one surface of the substrate, wherein the electro-conductive layer comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from $3\times10^{-5}$ to $1\times10^{-1}$ times the value of (x+3y/2+3z/2);

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from 0 to $1\times10^{-1}$ times the value of (x+3y/2+3z/2), in which a part of at least one of M(1), M(2) and In is replaced with one or more other elements, the elements replacing M(1) are of di- or higher valence and the elements replacing M(2) and In are of tri- or higher valence; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from 0 to $1\times10^{-1}$ times the value of (x+3y/2+3z/2), wherein said electro-conductive oxide is implanted with cations, and wherein the oxide deficit amount (d) and the amount of implanted cations are selected so that the electro-conductive oxide has an amount of carrier electrons of from $1\times10^{18}$/cm$^3$ to $1\times10^{22}$/cm$^3$.

2. An EL display comprising an electrode which comprises a transparent substrate and an electro-conductive layer provided on at least a part of at least one surface of the substrate, wherein the electro-conductive layer comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from $3\times10^{-5}$ to $1\times10^{-1}$ times the value of (x+3y/2+3z/2);

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from 0 to $1\times10^{-1}$ times the value of (x+3y/2+3z/2), in which a part of at least one of M(1), M(2) and In is replaced with one or more other elements, the elements replacing M(1) are of di- or higher valence and the elements replacing M(2) and In are of tri- or higher valence; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from 0 to $1\times10^{-1}$ times the value of (x+3y/2+3z/2), wherein said electro-conductive oxide is implanted with cations, and wherein the oxide deficit amount (d) and the amount of implanted cations are selected so that the electro-conductive oxide has an amount of carrier electrons of from $1\times10^{18}/cm^3$ to $1\times10^{22}/cm^3$.

3. A solar cell comprising an electrode which comprises a transparent substrate and an electro-conductive layer provided on at least a part of at least one surface of the substrate, wherein the electro-conductive layer comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from $3\times10^{-5}$ to $1\times10^{-1}$ times the value of (x+3y/2+3z/2);

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from 0 to $1\times10^{-1}$ times the value of (x+3y/2+3z/2), in which a part of at least one of M(1), M(2) and In is replaced with one or more other elements, the elements replacing M(1) are of di- or higher valence and the elements replacing M(2) and In are of tri- or higher valence; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range of from 0 to $1\times10^{-1}$ times the value of (x+3y/2+3z/2), wherein said electro-conductive oxide is implanted with cations, and wherein the oxide deficit amount (d) and the amount of implanted cations are selected so that the electro-conductive oxide has an amount of carrier electrons of from $1\times10^{18}/cm^3$ to $1\times10^{22}/cm^3$.

4. A liquid crystal display comprising an electrode which comprises a transparent substrate and an electro-conductive layer provided on at least a part of a least one surface of the substrate, wherein the electro-conductive layer exhibits 76% or more of transmission, normalized to 2000 Angstrom thickness as to the light of 400 nm, and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 70 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence, and wherein the oxygen deficit amount (d) and the amount of the replacing elements are selected so that the electro-conductive oxide exhibits 70 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 70 S/cm or more of electro-conductivity.

5. A liquid crystal display comprising an electrode which comprises a transparent substrate and an electro-conductive layer provided on at least a part of at least one surface of the substrate, wherein the electro-conductive layer exhibits 385 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 73 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 73 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 73 S/cm or more of electro-conductivity.

6. A liquid crystal display comprising an electrode which comprises a transparent substrate and an electro-conductive layer provided on at least a part of at least one surface of the substrate, wherein the electro-conductive layer exhibits 450 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 1280 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 1280 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 1280 S/cm or more of electro-conductivity.

7. A liquid crystal display comprising an electrode which comprises a transparent substrate and an electro-conductive layer provided on at least a part of at least one surface of the substrate, wherein the electro-conductive layer exhibits 400 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 240 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of replacing elements are selected so that the electro-conductive oxide exhibits 240 S/cm or more or electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 240 S/cm or more of electro-conductivity.

8. An EL display comprising an electrode which comprises a transparent substrate and an electro-conductive layer provided on at least a part of at least one surface of the substrate, wherein the electro-conductive layer exhibits 76% or more of transmission, normalized to 2000 Angstrom thickness as to the light of 400 nm, and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 70 S/cm or more of electro-conductivity;

ii) $M(1)_xM(2)_yIn_xO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 70 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 70 S/cm or more of electro-conductivity.

9. An EL display comprising an electrode which comprises a transparent substrate and an electro-conductive layer provided on at least a part of at least one surface of the substrate, wherein the electro-conductive layer exhibits 385 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 73 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 73 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 73 S/cm or more of electro-conductivity.

10. An EL display comprising an electrode which comprises a transparent substrate and an electro-conductive layer provided on at least a part of at least one surface of the substrate, wherein the electro-conductive layer exhibits 450 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 1280 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 1280 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 1280 S/cm or more of electro-conductivity.

11. An EL display comprising an electrode which comprises a transparent substrate and an electro-conductive layer provided on at least a part of at least one surface of the substrate, wherein the electro-conductive layer exhibits 400 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 240 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 240 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 240 S/cm or more of electro-conductivity.

12. A solar cell comprising an electrode which comprises a transparent substrate and an electro-conductive layer provided on at least a part of at least one surface of the substrate, wherein the electro-conductive layer exhibits 76% or more of transmission, normalized to 2000 Angstrom thickness as to the light of 400 nm, and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 70 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 70 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 70 S/cm or more of electro-conductivity.

13. A solar cell comprising an electrode which comprises a transparent substrate and an electro-conductive layer provided on at least a part of at least one surface of the substrate, wherein the electro-conductive layer exhibits 385 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 73 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 73 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 73 S/cm or more of electro-conductivity.

14. A solar cell comprising an electrode which comprises a transparent substrate and an electro-conductive layer provided on at least a part of at least one surface of the substrate, wherein the electro-conductive layer exhibits 450 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 1280 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced within one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 1280 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 1280 S/cm or more of electro-conductivity.

15. A solar cell comprising an electrode which comprises a transparent substrate and an electro-conductive layer provided on at least a part of at least one surface of the substrate, wherein the electro-conductive layer exhibits 400 nm or less of absorption edge wavelength in the shorter wavelength region and comprises an electro-conductive oxide represented by a general formula selected from the group consisting of:

i) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1 and the oxygen deficit amount (d) is within a range in which the electro-conductive oxide exhibits 240 S/cm or more of electro-conductivity;

ii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, in which a part of at least one of M(1), M(2) and In is replaced with one or more other elements, the elements replacing M(1) are of di- or higher valence and the elements replacing M(2) and In are of tri- or higher valence and wherein the oxygen deficit amount (d) and the amount of the replacing elements are selected so that the electro-conductive oxide exhibits 240 S/cm or more of electro-conductivity; and iii) $M(1)_xM(2)_yIn_zO_{(x+3y/2+3z/2)-d}$ wherein M(1) is at least one element selected from the group consisting of magnesium and zinc, M(2) is at least one element selected from the group consisting of aluminum and gallium, the ratio (x:y) is within a range of 0.2 to 1.8:1, the ratio (z:y) is within a range of 0.4 to 1.4:1, wherein said electro-conductive oxide is implanted with cations, and wherein the oxide deficit amount (d) and the amount of implanted cations are selected so that the electro-conductive oxide exhibits 240 S/cm or more of electro-conductivity.

\* \* \* \* \*